(12) United States Patent
Gedalius et al.

(10) Patent No.: US 7,725,421 B1
(45) Date of Patent: May 25, 2010

(54) DUPLICATE ACCOUNT IDENTIFICATION AND SCORING

(75) Inventors: Joel Gedalius, Mountain View, CA (US); Brian Sinay, Menlo Park, CA (US); Naval Verma, Sunnyvale, CA (US); Julian Wong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 11/460,061

(22) Filed: Jul. 26, 2006

(51) Int. Cl.
*G06F 17/00* (2006.01)

(52) U.S. Cl. .............................. 707/2; 707/3

(58) Field of Classification Search ................ 707/1–10
See application file for complete search history.

(56) References Cited

U.S. PATENT DOCUMENTS

| | | | | |
|---|---|---|---|---|
| 4,646,061 A * | 2/1987 | Bledsoe | | 341/65 |
| 6,961,721 B2 * | 11/2005 | Chaudhuri et al. | | 707/1 |
| 7,079,051 B2 * | 7/2006 | Storer et al. | | 341/51 |
| 2001/0034717 A1 * | 10/2001 | Whitworth | | 705/64 |
| 2002/0023135 A1 * | 2/2002 | Shuster | | 709/206 |
| 2003/0225850 A1 * | 12/2003 | Teague | | 709/207 |
| 2004/0024817 A1 * | 2/2004 | Pinkas | | 709/203 |
| 2004/0220920 A1 * | 11/2004 | Bax et al. | | 707/3 |
| 2004/0249789 A1 * | 12/2004 | Kapoor et al. | | 707/2 |
| 2005/0203857 A1 * | 9/2005 | Friedman | | 705/78 |
| 2005/0262210 A1 * | 11/2005 | Yu | | 709/206 |
| 2006/0117228 A1 * | 6/2006 | Theimer et al. | | 714/45 |
| 2006/0123478 A1 * | 6/2006 | Rehfuss et al. | | 726/22 |
| 2006/0149674 A1 * | 7/2006 | Cook et al. | | 705/44 |
| 2006/0224624 A1 * | 10/2006 | Korn et al. | | 707/104.1 |
| 2008/0104712 A1 * | 5/2008 | Oliver et al. | | 726/27 |

OTHER PUBLICATIONS

Anonymous, "Fuzzy String Searching", Sep. 9, 2008 (Wikipedia Online Encyclopedia Definition).*
Anonymous, "Edit Distance", Sep. 9, 2008 (Wikipedia Online Encyclopedia Definition).*
Microsoft Computer Dictionary, 5$^{th}$ Edition, Published: 2002, (Definition: Huffman Coding).*
Anoynymous, "Fuzzy String Searching", Sep. 9, 2008, (Wikipedia Online Encyclopedia Definition).*
Anonymous, "Edit Distance", Sep. 9, 2008 (Wikipedia Online Encyclopedia Definition).*
Microsoft Computer Dictionary, 5th Edition, Published: 2002, (Definition: Huffman Coding).*

* cited by examiner

*Primary Examiner*—Mohammad Ali
*Assistant Examiner*—John P Hocker
(74) *Attorney, Agent, or Firm*—Harrity & Harrity, LLP

(57) ABSTRACT

A system matches accounts based on attributes of the accounts, and scores the matched account pairs based on a probability of the matched accounts being duplicate accounts. The system can utilize the matched and scored account pairs to determine duplicate accounts, and terminate at least one of the accounts in a duplicate account pair.

39 Claims, 18 Drawing Sheets

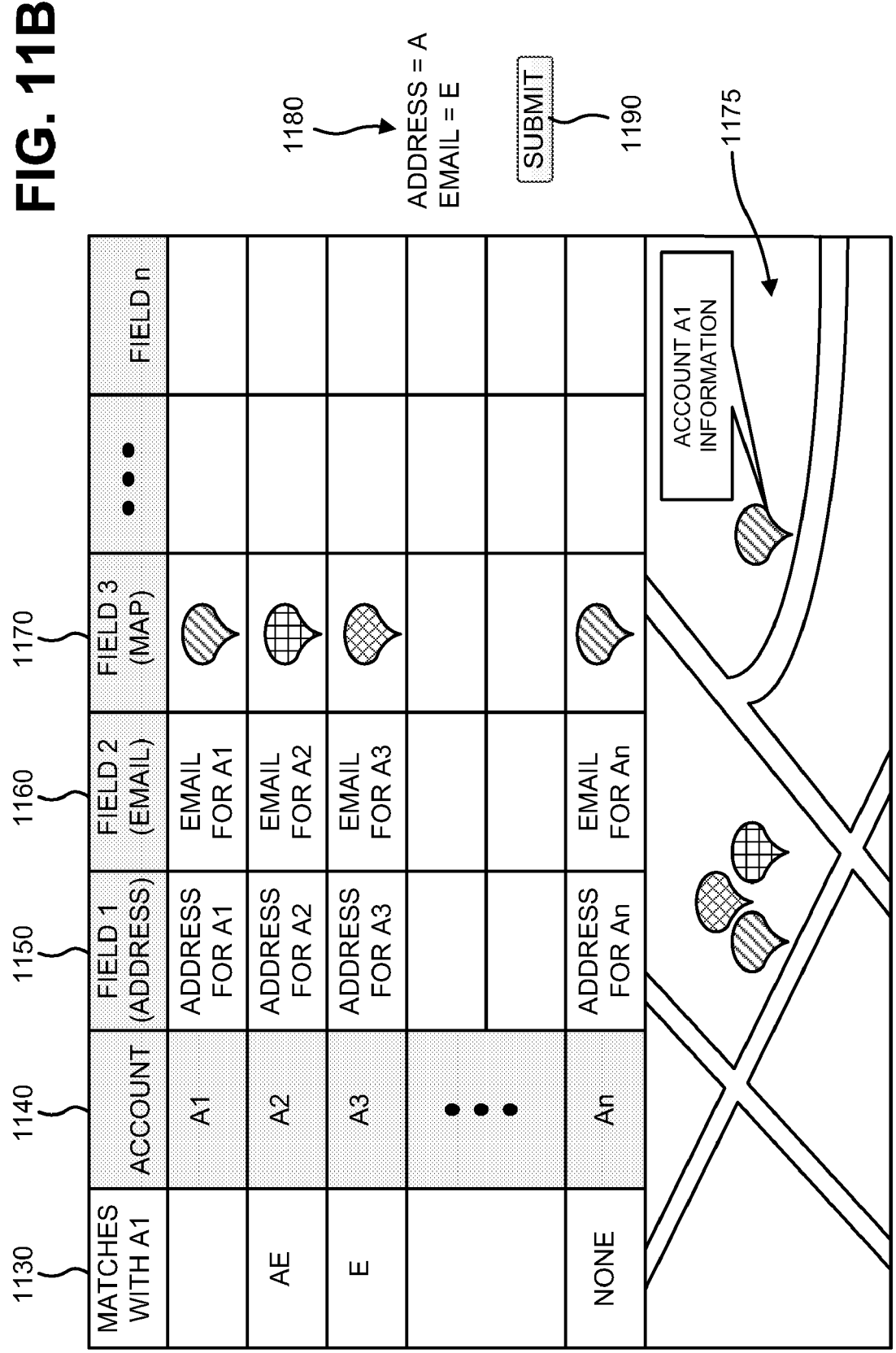

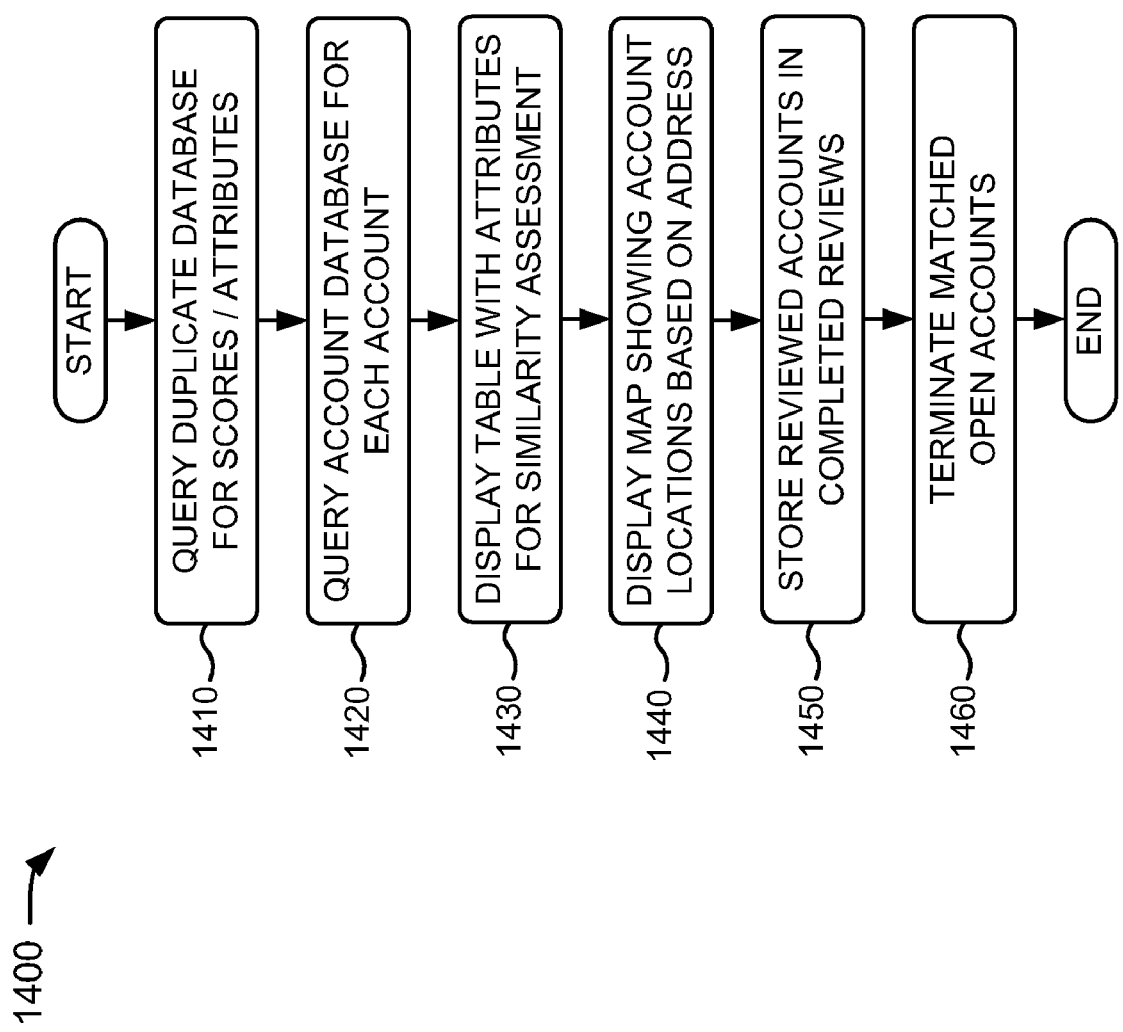

DUPLICATE ACCOUNT IDENTIFICATION AND SCORING

BACKGROUND

1. Field of the Invention

Implementations described herein relate generally to account maintenance, and, more particularly, to identifying, scoring, and terminating duplicate accounts.

2. Description of Related Art

Customers of a company may attempt to open multiple accounts for a variety of reasons. For example, customers may open multiple accounts for personal bookkeeping reasons, because they forgot about an existing account, for an improper purpose (e.g., violating a company policy), etc. One example of using multiple accounts for an improper purpose may be using automated means (e.g. bots) to register for multiple email accounts for the transmission of "spam." Spam may include electronic junk mail or junk newsgroup postings (e.g., generally email advertising for some product sent to a mailing list or newsgroup). In addition to wasting the recipient's time with unwanted email, spam also consumes network bandwidth.

Another example of using multiple accounts for an improper purpose may be penny stock scams. For example, in the most common penny stock scheme (e.g., the pump and dump), a small group of speculators will accumulate a large number of shares in a penny stock. Once their positions are in place, they will release positive financial information (e.g., through spam) that may drastically affect people's perception of the stock. The intent is to get small time investors to start trading irrationally. The news is almost always false, but before this is discovered, the price of the stock often skyrockets and the original speculators exit with large profits.

SUMMARY

According to one aspect, a method may include receiving a trigger event for a first user account, matching the triggered first user account to a second user account, and scoring the matched user account pair.

According to another aspect, a method may include receiving a terminated user account, and matching the terminated user account with an open user account if the matched user accounts have a score greater than a preset score threshold.

According to yet another aspect, a method may include receiving scores and one or more attributes for a user account and one or more matched user accounts, displaying a table providing the user account, the matched user accounts, the attributes, and matching attributes from the matched user accounts, and enabling selection of at least one of the matched user accounts from the table based on the matching attributes.

According to a further aspect, a system may include a backend matching unit that receives account information, and performs account matching and scoring, and a prioritization reviewing unit that receives matched account pairs and the scores of the pairs, and prioritizes the matched account pairs based on the scores.

According to another aspect, a system may include an account database that includes attributes about accounts that can be used to identify relationships to other accounts, a duplicate database that includes scores and relationships for matched account pairs, a review queue database that receives prioritized account pairs from the duplicate database, and a completed reviews database that includes the results of further reviews of the prioritized account pairs received from the review queue database. The system may also include a matching unit that receives information from the account database, performs account matching and scoring, and provides the scores and relationships for account pairs to the duplicate database. The system may further include a prioritization reviewing unit that receives matched account pairs and the scores of the account pairs from the account database and the duplicate database, prioritizes the matched account pairs based on the scores, and provides account pairs to the review queue database. The system may also include a reviewing unit that receives account information from the account database, receives matched account pairs and the scores of the pairs from the duplicate database, receives prioritized matched account pairs from the review queue database, and further reviews the account pairs and provides the further reviews to the completed reviews database.

According to yet another aspect, a system may include means for receiving trigger events for accounts, means for matching the triggered accounts to other accounts, means for scoring the matched account pairs, and means for utilizing the matched and scored account pairs to determine duplicate accounts.

According to a further aspect, a system may include a memory to store a plurality of instructions, and a processor to execute instructions in the memory. The processor may match accounts based on attributes of the accounts, score the matched account pairs, utilize the matched and scored account pairs to determine duplicate accounts, and terminate at least one of the accounts in a duplicate account pair.

According to a still further aspect, a method may include matching accounts based on attributes of the accounts, scoring the matched account pairs based on a probability of the matched accounts being duplicate accounts, utilizing the matched and scored account pairs to determine duplicate accounts, and terminating at least one of the accounts in a duplicate account pair.

BRIEF DESCRIPTION OF THE DRAWINGS

The accompanying drawings, which are incorporated in and constitute a part of this specification, illustrate one or more embodiments of the invention and, together with the description, explain aspects of the invention. In the drawings:

FIG. 11B is an exemplary diagram of a table capable of being displayed by the frontend reviewing unit of FIG. 11A;

FIG. 14 is a flowchart of an exemplary process for reviewing and terminating matched accounts.

DETAILED DESCRIPTION

The following detailed description of the invention refers to the accompanying drawings. The same reference numbers in different drawings may identify the same or similar elements. Also, the following detailed description does not limit the invention.

Typically, companies attempt to identify multiple customer or user accounts by running structured query language (SQL) queries to find exact matches on certain simple attributes, and using an "AND/OR" logic to combine the results based on various matching attributes. Such typical systems may have various deficiencies that make them easy to defeat. For example, typical systems may not have a good set of attributes for matching, and may fail to match attributes in ways other than an exact match. Typical systems also may fail to perform fuzzy matches quickly, and may fail to score the matches based on attributes. Further, such systems may not be able to combine matches based on multiple attributes in an optimal way, and may not efficiently handle customers creating multiple accounts for improper purposes.

Overview

Figure 1:
FIG. 1 is a diagram of an overview of an exemplary implementation described herein.

Implementations described herein may provide systems and methods for identifying, scoring, and terminating duplicate and/or related accounts. For example, in one implementation, as shown in FIG. 1, the system may match or identify accounts based on any user-supplied account information (e.g., a contact name) or system-detected account identifying information (e.g., an Internet Protocol (IP) address). The system may also score the matching accounts, and may generate a queue of matches deemed to be interesting. The scored matching accounts may be confirmed, and any open duplicate accounts may be terminated. The systems and methods described herein may provide a variety of account attributes for matching, may match attributes in ways other than an exact match, may provide fuzzy matches quickly, may combine the matched accounts based on multiple attributes in an optimal way, and may efficiently handle customers or users creating multiple accounts for improper purposes.

An "account," as the term is used herein, is to be broadly interpreted to include any mechanism for a user to identify or authenticate themselves to an organization for the purposes of using the organization's products or services, accounting, security, logging in, resource management, etc. For example, an account may include an email account, a newsgroup account, a computer system account, a computer network account, a bank account, a credit card account, a PayPal® account, an eBay® account, a patient record, etc. An account may be identified by a username (which may also be referred to as a "login name" or a "logon"), an identification mechanism (e.g., a number, code, etc.), and/or commonly a password.

An "organization," as the term is used herein, is to be broadly interpreted to include any institution, company, entity, etc. desiring to identify duplicate and/or related accounts. For example, an organization may include any entity that processes payments, wants to reduce the marginal costs incurred for each additional customer, or wants to consolidate their records (e.g., a medical organization may wish to consolidate their patient records).

Exemplary Network Configuration

Figure 2:
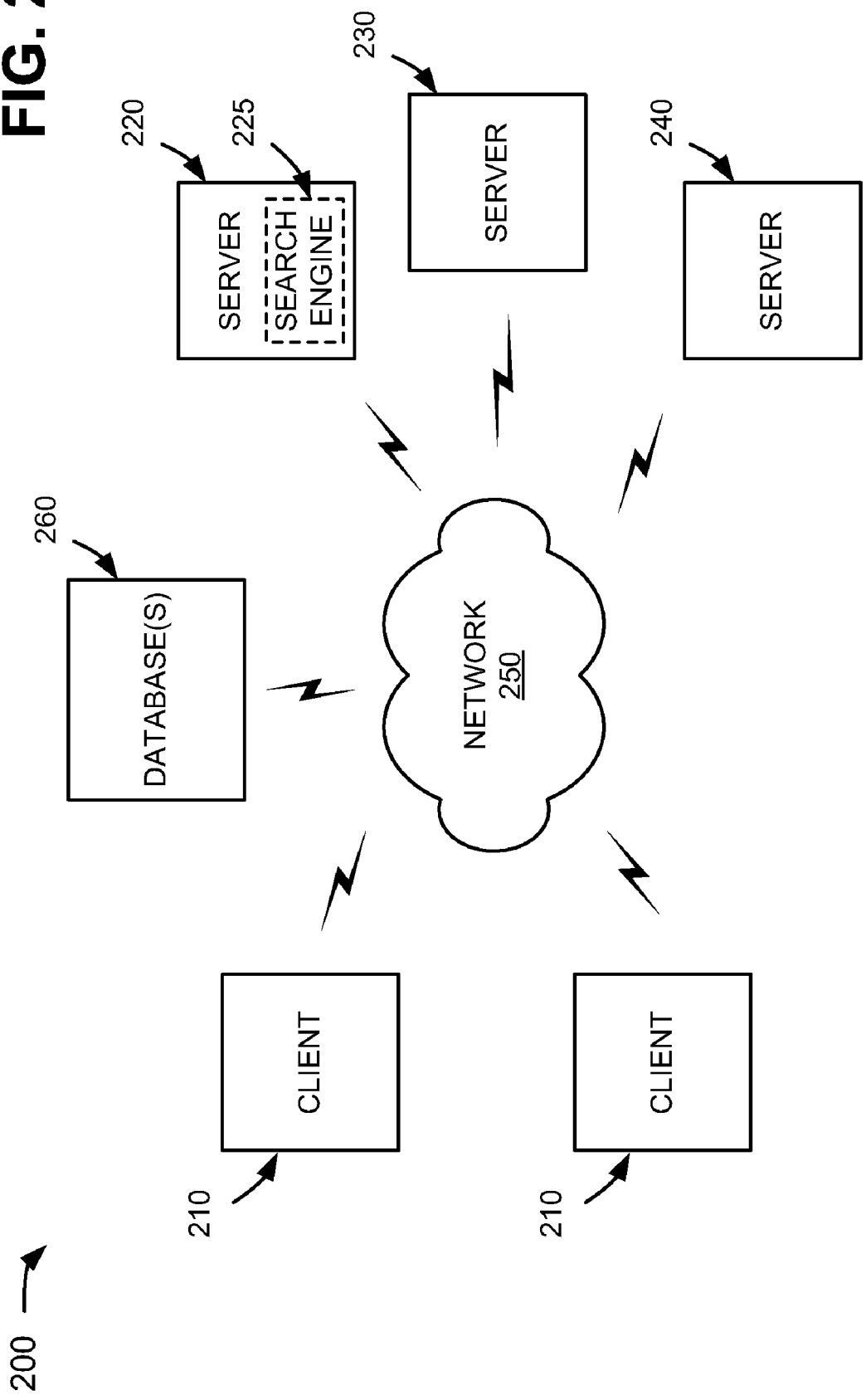
FIG. 2 is a diagram of an exemplary network in which systems and methods described herein may be implemented.

FIG. 2 is an exemplary diagram of a network 200 in which systems and methods described herein may be implemented. Network 200 may include multiple clients 210 connected to multiple servers 220-240 and a database(s) 260 via a network 250. Network 250 may include a local area network (LAN), a wide area network (WAN), a telephone network, such as the Public Switched Telephone Network (PSTN), an intranet, the Internet, or a combination of networks. Two clients 210 and three servers 220-240 have been illustrated as connected to network 250 for simplicity. In practice, there may be more or fewer clients and servers. Also, in some instances, a client may perform one or more functions of a server and/or a server may perform one or more functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents. Clients 210 and servers 220-240 may connect to network 250 via wired, wireless, and/or optical connections.

Database(s) 260 may include a random access memory (RAM) or another type of dynamic storage device that may store information and instructions for execution by a processor; a ROM device or another type of static storage device that may store static information and instructions for use by a processor; and/or a magnetic and/or optical recording medium and its corresponding drive. Although FIG. 2 shows database(s) 260 as a separate component, database(s) 260 may be incorporated in any of servers 220-240.

In one implementation, server 220 may include a search engine 225 usable by clients 210. Any combination of servers 220-240 and database(s) 260 may identify, score, and terminate duplicate and/or related accounts. While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Exemplary Client/Server Architecture

Figure 3:
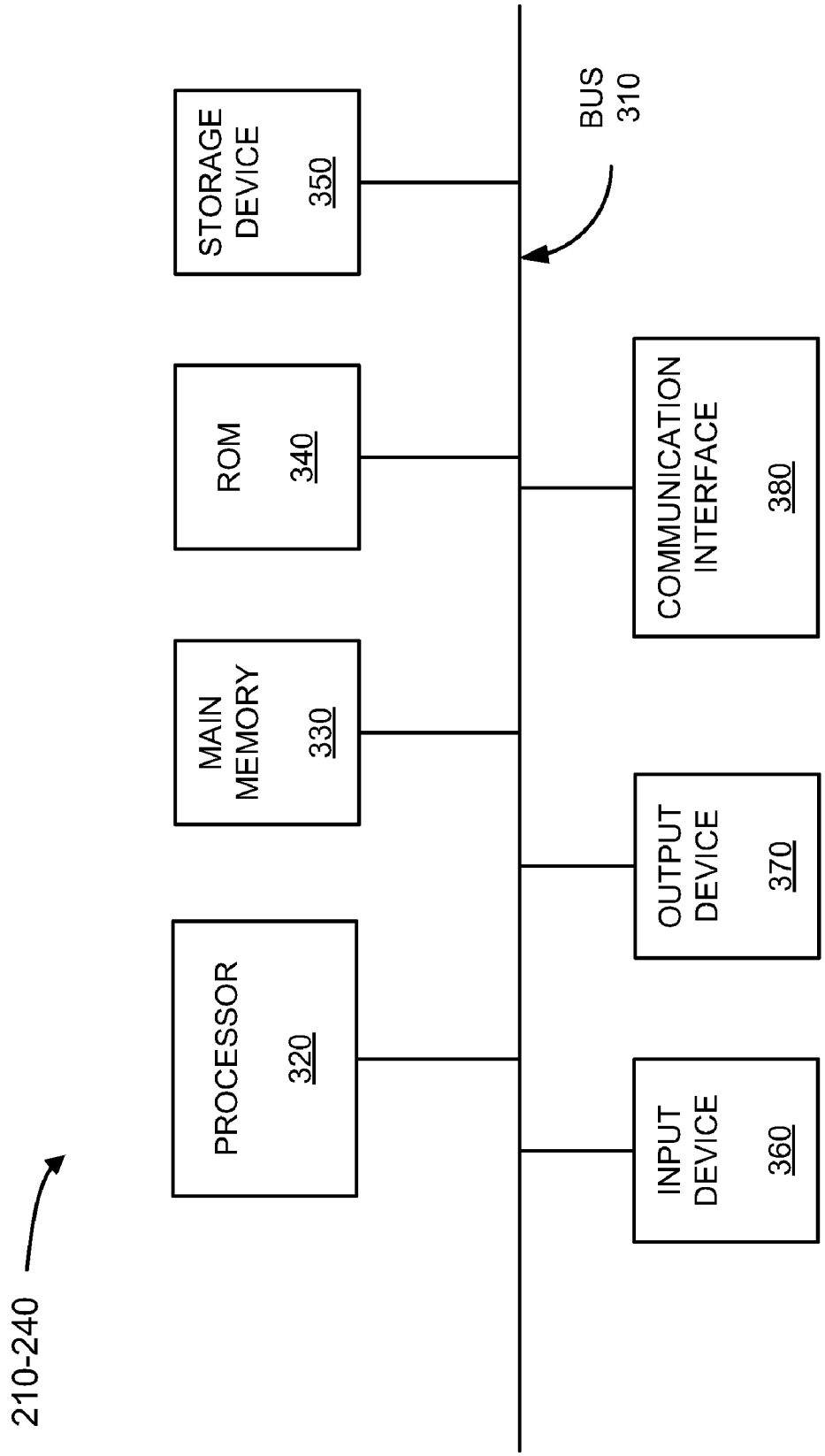
FIG. 3 is an exemplary diagram of a client or server of the exemplary network of FIG. 2.

FIG. 3 is an exemplary diagram of a client or server entity (hereinafter called "client/server entity"), which may correspond to one or more of clients 210 and servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain identification, scoring, and termination of duplicate and/or related account operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Duplicate Account Identification System

Figure 4:
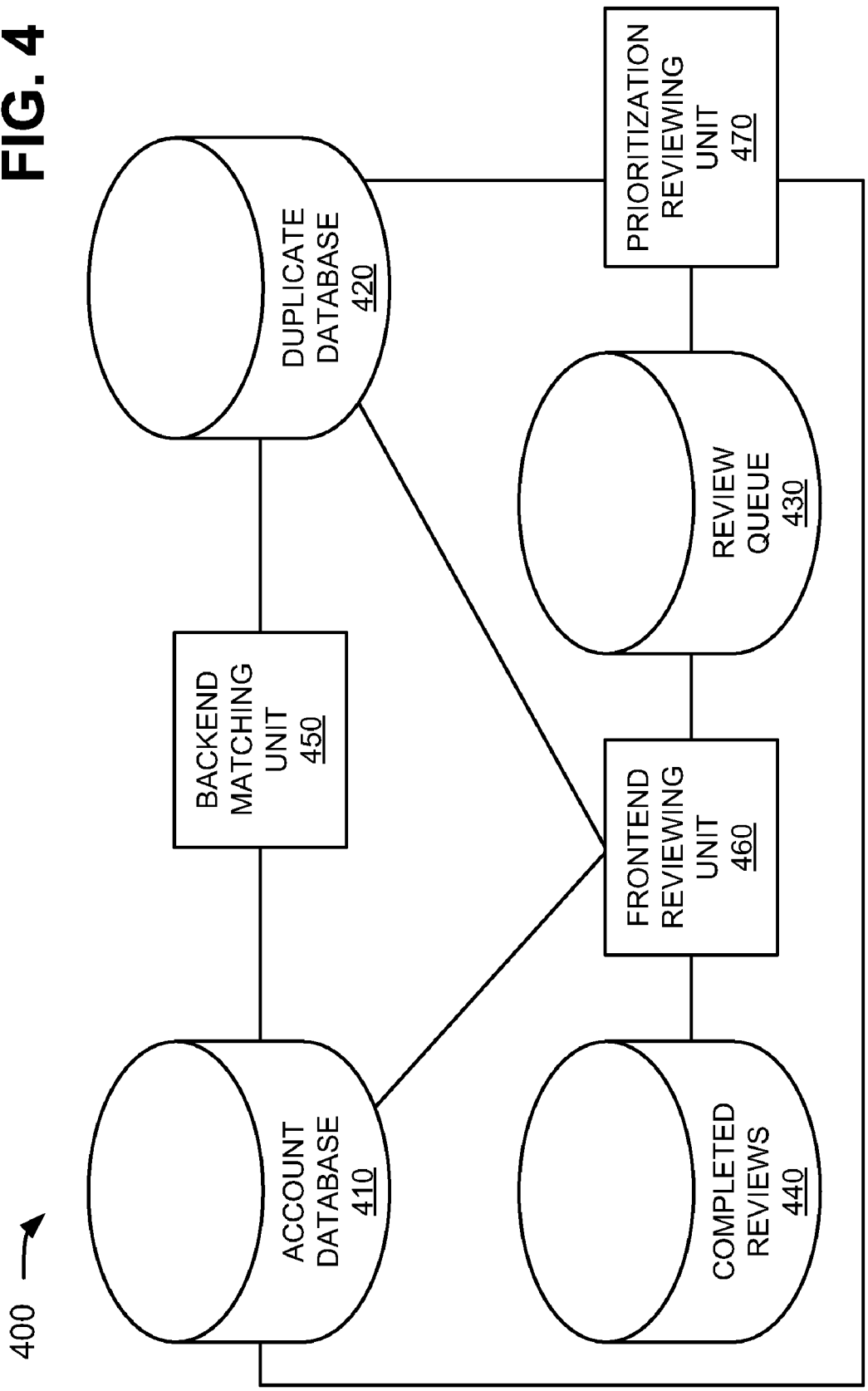
FIG. 4 is a diagram of a system for identifying duplicate accounts according to an exemplary implementation.

FIG. 4 is a diagram of a system 400 for identifying duplicate and/or related accounts according to an exemplary implementation. According to one implementation, one or more of the functions of the system, as described below, may be performed by a server (e.g., server 220), a database (e.g., database 260) in combination with a server, a portion of server 220 and/or database 260, or a combination of servers (e.g., servers 220-240) and/or databases (e.g., database(s) 260). According to another implementation, one or more of these functions may be performed by an entity separate from server 220, such as a client (e.g., client 210), a computer associated with server 220 or one of servers 230 or 240.

As shown in FIG. 4, system 400 may include an account database 410, a duplicate database 420, a review queue database 440, a complete reviews database 440, a backend matching unit 450, a frontend reviewing unit 460, and a prioritization reviewing unit 470. Account database 410 and duplicate database 420 may connect to backend matching unit 450 and frontend reviewing unit 460. Frontend reviewing unit 460 may further connect to review queue database 430 and completed reviews database 440. Account database 410, duplicate database 420, and review queue database 430 may connect to prioritization reviewing unit 470. The connections of the components of the system of FIG. 4 may be wired, wireless, and/or optical connections.

Account database 410 may include fields or attributes about customer accounts that may be used to identify relationships with other customer accounts. Duplicate database 420 may include scores and relationships for account pairs generated by matching algorithms described below. Review queue database 430 may receive prioritized account pairs from duplicate database 420 and may provide storage of such account pairs for further review. Completed reviews database 440 may include the results of further reviews of prioritized account pairs received from review queue database 430.

Backend matching unit 450 may receive information from account database 410, perform account matching and scoring, and provide the scores and relationships for account pairs to duplicate database 420. Prioritization reviewing unit 470 may receive matched account pairs and the scores of the pairs from account database 410 and duplicate database 420, may prioritize the matched account pairs based on the scores, and may provide a queue of interesting account pairs to review queue database 430. Frontend reviewing unit 460 may receive account information from account database 410, may receive matched account pairs and the scores of the pairs from duplicate database 420, may receive prioritized matched account pairs from review queue database 430, and may further review account pairs and provide the further reviews to completed reviews database 440.

Although FIG. 4 shows databases (e.g., account database 410, duplicate database 420, review queue database 430, and completed reviews database 440) as separate components, such databases may be provided in a single storage device (e.g., main memory 330, ROM 340, and/or storage device 350). Furthermore, although FIG. 4 shows backend matching unit 450, frontend reviewing unit 460, and prioritization reviewing unit 470 as separate components, the tasks of such units may be performed by a single processor (e.g., processor 320).

FIGS. 5-11B are exemplary diagrams of the components of the exemplary system (e.g., system 400).

Account Database

Figure 5:
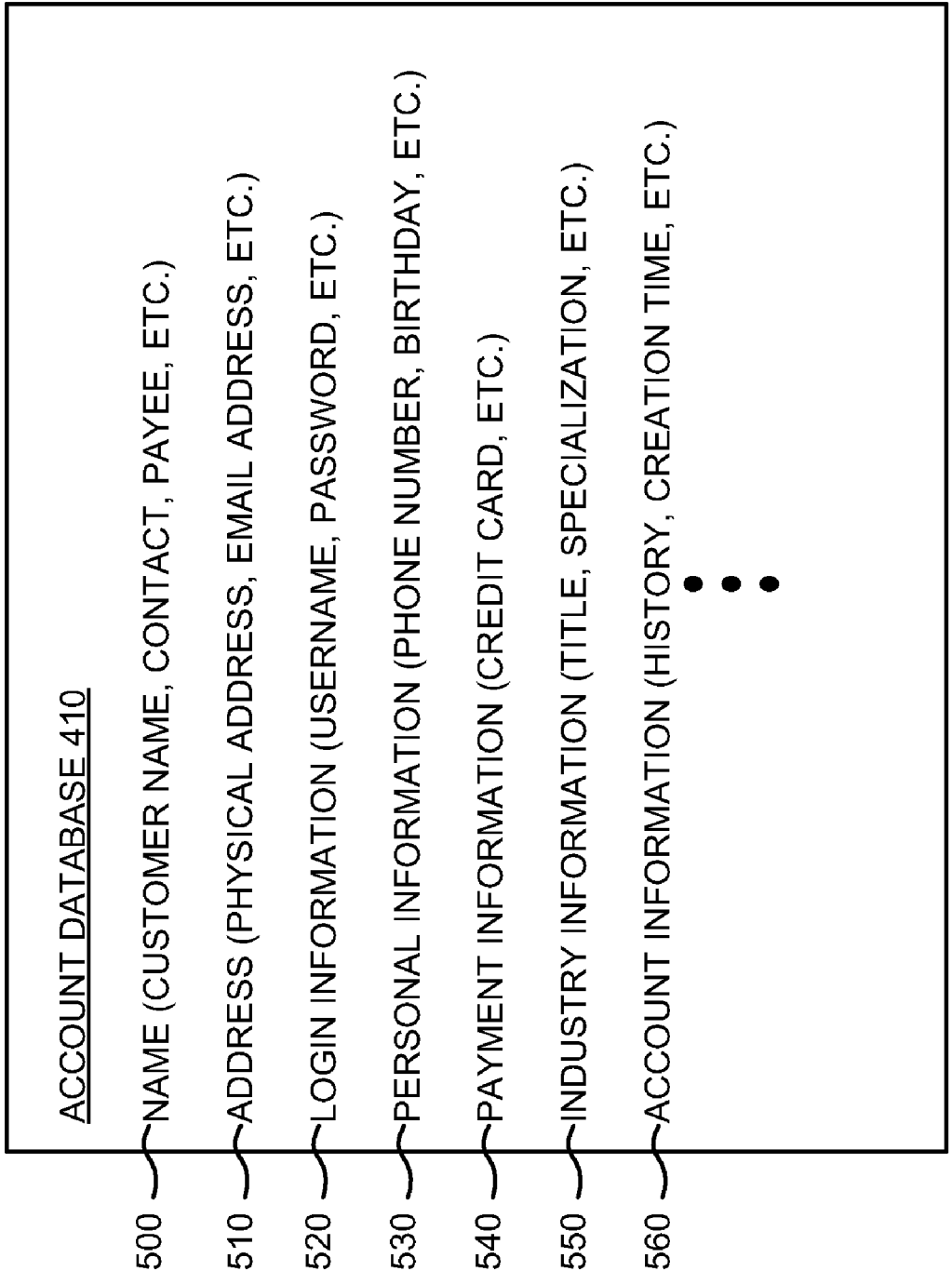
FIG. 5 is an exemplary diagram of an account database of the exemplary system of FIG. 4.

Account database 410, as shown in FIG. 5, may store a variety of information related to customer accounts. For example, in one implementation, account database 410 may include the following account-related fields or attributes: name field(s) 500 (e.g., a customer name, an account contact person, a payee of an account, etc.), address field(s) 510 (e.g., a physical address (e.g., 123 Hypothetical Lane), an email address, a billing address, website address(es), IP address(es), etc.), login information field(s) 520 (e.g., username, password, user identification, etc.), personal information field(s) 530 (e.g., telephone number, birthday, age, etc.), payment information field(s) 540 (e.g., credit card number(s), bank account number(s), etc.), industry information 550 (e.g., title, specialization, etc.), account information 560 (e.g., account history, creation time of the account, etc.), etc.

Although FIG. 5 shows exemplary fields included in account database 410, in other implementations, account database 410 may include any field or attribute about accounts that may be useful to identify relationships to other accounts.

Duplicate Database

Figure 6:
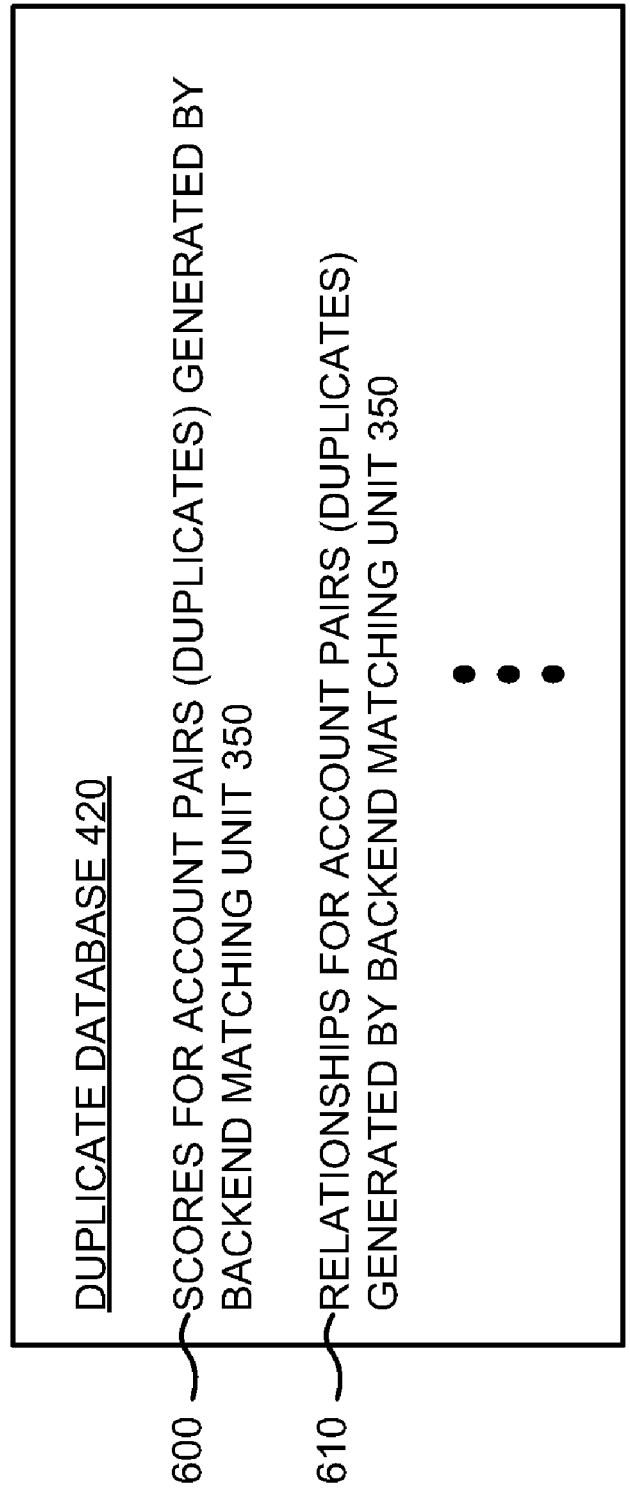
FIG. 6 is an exemplary diagram of a duplicate database of the exemplary system of FIG. 4.

Duplicate database 420, as shown in FIG. 6, may store a variety of information related to customer accounts. For example, in one implementation, duplicate database 420 may include scores 600 for account pairs (e.g., duplicate or potentially duplicate accounts) generated by backend matching unit 450, relationships 610 for the account pairs generated by backend matching unit 450, etc. Scores 600 for account pairs may include the scores for account pairs which may represent the probability that two accounts of a pair are owned by the same customer, scores for different account attributes, etc. Account pair relationships 610 may include information related to accounts determined to match based on account attributes, matching attributes of account pairs, attribute information, etc. As described below, backend matching unit 450 may use matching algorithms to generate account pairs and relationships 610, and may use scoring formulas to generate scores 600 for account pairs. Although FIG. 6 shows exemplary information included in duplicate database 420, in other implementations, duplicate database 420 may include any field or attribute about accounts that may be useful to identify relationships to other accounts.

Review Queue Database

Figure 7:
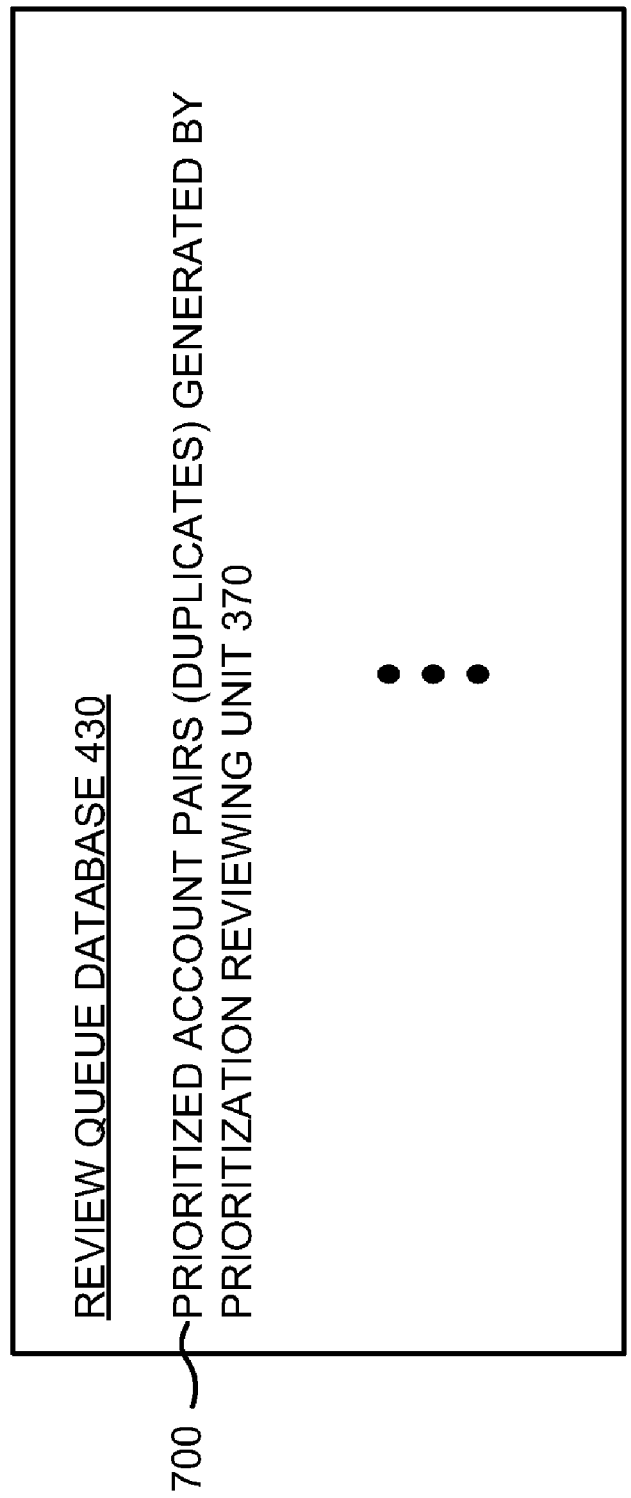
FIG. 7 is an exemplary diagram of a review queue database of the exemplary system of FIG. 4.

Review queue database 430, as shown in FIG. 7, may store a variety of information related to customer accounts. For example, in one implementation, review queue database 430 may include prioritized account pairs 700 (e.g., duplicate or potentially duplicate accounts) generated by prioritization reviewing unit 470, etc. Prioritized account pairs 700 may include information related to scored, matched account pairs (e.g., attributes, account information, etc.) that may be ordered based on their scores. As described below, prioritization reviewing unit 470 may prioritize account pairs provided from duplicate database 420. Although FIG. 7 shows exemplary information included in review queue database 430, in other implementations, review queue database 430 may include any field or attribute about accounts that may be useful to identify relationships to other accounts.

Completed Reviews Database

Figure 8:
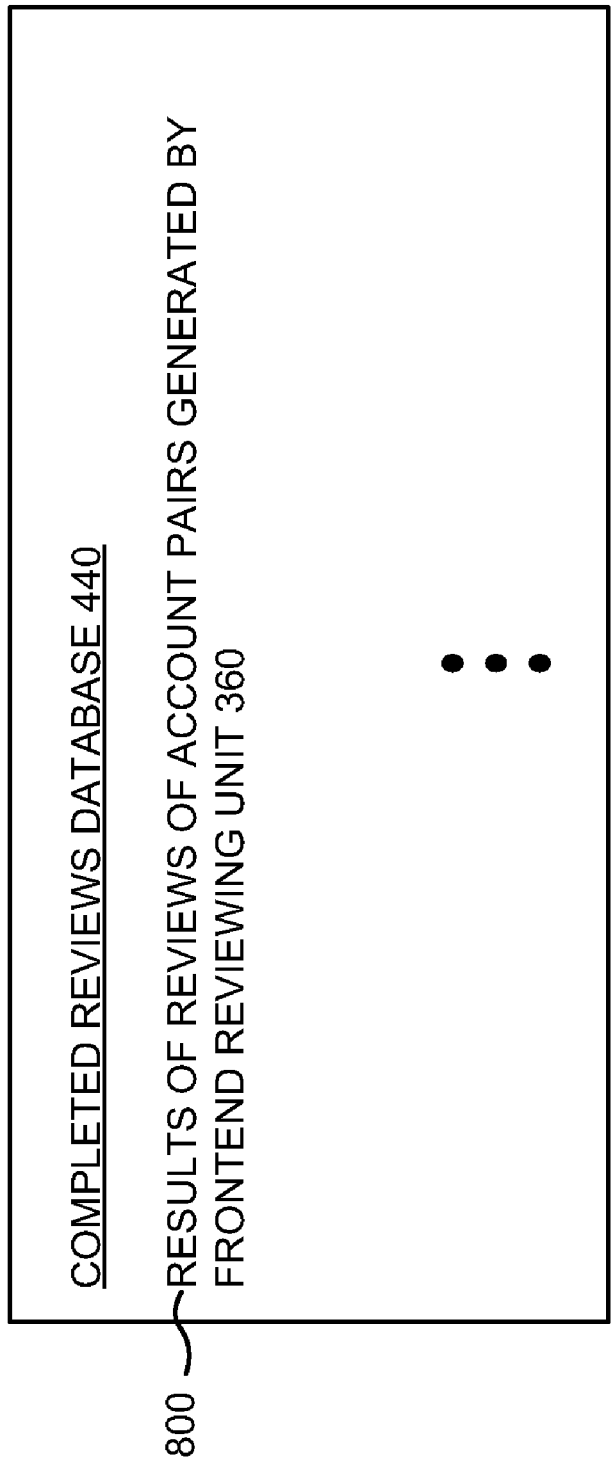
FIG. 8 is an exemplary diagram of a completed reviews database of the exemplary system of FIG. 4.

Completed reviews database 440, as shown in FIG. 8, may store a variety of information related to customer accounts. For example, in one implementation, completed reviews database 440 may include results 800 of reviews of account pairs (e.g., duplicate or potentially duplicate accounts) generated by frontend reviewing unit 460, etc. Results 800 may include information for accounts determined to match based on a manual review of the accounts, information for accounts determined to match based on an automatic review of the accounts, scores of the matched accounts, etc. As described below, frontend reviewing unit 460 may receive matched account pairs and the scores of the pairs from duplicate database 420, may receive prioritized matched account pairs from review queue database 430, and may further review account pairs and provide the further reviews to completed reviews database 440. Although FIG. 8 shows exemplary information included in completed reviews database 440, in other implementations, completed reviews database 440 may include any field or attribute about accounts that may be useful to identify relationships to other accounts.

Backend Matching Unit

Figure 9:
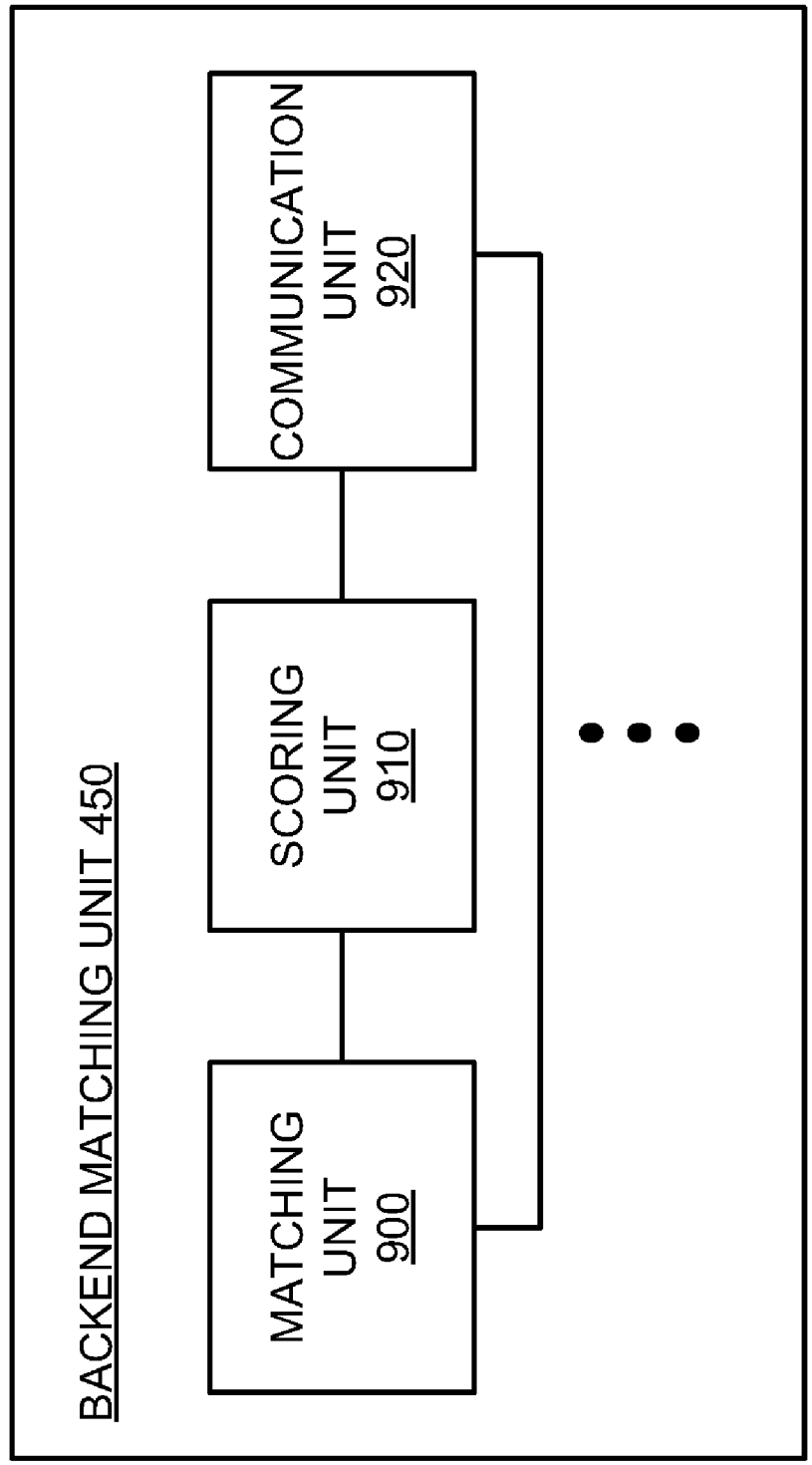
FIG. 9 is an exemplary diagram of a backend matching unit of the exemplary system of FIG. 4.

Backend matching unit 450, as shown in FIG. 9, may perform a variety of tasks to aid in identification of duplicate accounts. For example, in one implementation, backend matching unit 450 may include a matching unit 900 that matches triggered accounts to open accounts provided in account database 410, a scoring unit 910 that scores matching account pairs (e.g., duplicate or potentially duplicate accounts), a communication unit 920 that communicates or provides relationships and/or scores of matched accounts to duplicate database 420, etc. Although FIG. 9 shows exemplary tasks performed by backend matching unit 450, in other implementations, backend matching unit 450 may perform additional tasks that may be used to identify duplicate accounts.

In one implementation, backend matching unit 450 may periodically (e.g., daily, weekly, etc.) search for trigger events and may perform duplicate checks on the triggered accounts. An account may be triggered for a variety of reasons (e.g., a customer logging into an account, an account being recently created, etc.). Backend matching unit 450 may compare and attempt to match the triggered accounts with accounts provided in accounts database 410. Accounts may be matched based on various account attributes (e.g., name field(s) 500, address field(s) 510, etc.). Backend matching unit 450 may score a matched pair of accounts. The score for an account pair may represent the probability that the two accounts may be owned by the same customer. Backend matching unit 450 may score account pairs based on a single account attribute at a time. For example, backend matching unit 450 may score an account pair based on the IP addresses that they share, and then may score the account pair based on the contact names that they share, etc. Backend matching unit 450 may combine the scores from different attributes to generate a single score of an account pair.

Backend matching unit 450 may use a variety of matching and scoring algorithms to compare a pair of accounts. For example, in one implementation, backend matching unit 450 may use a string edit distance as a measure of similarity for account matching purposes. Calculating edit distances may be very expensive. If every string in a database is to be matched to every other string, the time required to execute the string edit distance algorithm may be $O(n^2)$, where "n" is the number of entries in the database. Backend matching unit 450 may utilize a string edit distance algorithm that reduces the time required from $O(n^2)$ to $O(n \log(n))$. The string edit distance algorithm may include the following steps.

Assuming that a database (e.g., account database 410) includes a set (S) of N strings (where N may be the size of the set), backend matching unit 450 may determine whether each string of set (S) is a neighbor of the other strings, where two strings may be considered neighbors if their edit distance is less than or equal to a preset edit distance threshold. Backend matching unit 450 may convert each string of set (S) into a histogram of characters. For example, backend matching unit 450 may convert the characters of "foo dr" into {"f":1, "o":2, "d":1, "r":1}. The histogram may be a graphical representation of a dataset, tallied into classes. The histogram may include a series of rectangles whose widths are defined by the limits of the classes, and whose heights are determined by the frequency in each interval. The histogram may further depict attributes of the data, including location, spread, and symmetry. Backend matching unit 450 may calculate the overall character frequencies for stings simultaneously with or after creation of the histogram of characters.

Backend matching unit 450 may merge the characters to form bins. A variety of merging techniques may be used to merge characters to form bins (e.g., Huffman coding). Huffman coding is an entropy encoding algorithm used for lossless data compression. The term may refer to the use of a variable-length code table for encoding a source symbol (e.g., a character in a file) where the variable-length code table may be derived in a particular way based on the estimated probability of occurrence for each possible value of the source symbol. For example, backend matching unit 450 may assign each character to its own bin. The count of a bin may represent the frequency of the set of characters included in the bin. Backend matching unit 450 may merge the bins with the lowest counts into a single bin, and may merge the counts until a preset number of bins (D) is obtained. Backend matching unit 450 may convert the histogram of characters for each string into a corresponding smaller dimension histogram of bins using the character to bin mapping obtained from the merging technique (e.g., Huffman coding). Backend matching unit 450 may further append the length of each string as the last bin of the corresponding histogram of bins.

At this point, backend matching unit may have transformed set (S) into another set (H) of D+1 dimensional integral vectors. D+1 dimensions may be obtained by appending the length of each string as the D+1th dimension, as described above and below. Backend matching unit 450 may use the elements of set (H) to construct a kd-tree, and may use Manhattan distance (also known as $L_1$ distance) as the distance metric. A "kd-tree" (i.e., k-dimensional tree) may be a space-partitioning data structure for organizing points in a k-dimensional space. The Manhattan distance may be defined between two points in an Euclidean space with fixed Cartesian coordinate system as the sum of the lengths of the projections of the line segment between the points onto the coordinate axes. For example, in the plane, the Manhattan distance between the point $P_1$ with coordinates $(x_1, y_1)$ and the point $P_2$ at $(x_2, y_2)$ is $|x_1-x_2|+|y_1-y_2|$. For each element of set (H), backend matching unit 450 may locate its "k" nearest neighbors using a fixed radius search, where the radius may equal two times the preset edit distance threshold. Backend matching unit 450 may calculate the exact edit distance between the located "k" nearest neighbors and may keep the neighbors that have an edit distance of less than or equal to the preset edit distance threshold.

By making the radius two times the preset edit distance threshold and appending the length of each string as the last bin of the corresponding histogram of bins, backend matching unit 450 may eliminate potential problems with the calculation of the edit distances. For example, if the length of each string was not appended as the last bin of the corresponding histogram of bins, the operation of adding or deleting a character may lead to a maximum distance change of one in the histogram space. However, an edit (conversion) operation may look like an addition and a deletion, and, therefore, may change the distance by two. This would require a two-fold increase in the preset edit distance threshold to ensure nothing is missed, but may cause false positives from the kd-tree search if the located neighbors have additions and deletions and not just edits. Such problems are eliminated by backend matching unit 450 making the radius two times the preset edit distance threshold and appending the length of each string as the last bin of the corresponding histogram of bins. For example, edits may increase the distance by two, but may not change the length of the string. Additions and deletions may increase the distance by one, and may change the length of the string by one.

In another implementation, backend matching unit 450 may score account pairs based on exact matching of account attributes (e.g., IP addresses). A scoring algorithm performed by backend matching unit 450 may weigh associations through commonly shared account attributes, and may weigh associations where two accounts do not share an account attribute often enough. The scoring algorithm may include the following. Backend matching unit 450 may create a unidirected bi-partite graph that may include the accounts on one side, and values for account attributes on another side. An edge may be created from an account to account attribute in the graph. For example, an edge may be created from an account to an IP address (i.e., an account attribute) if the customer has logged into their account using the IP address. The weight on the edge may be the number of times the customer has logged into the account using the IP address. Backend matching unit 450 may score an account pair according to the following equation:

$$\text{Score}(A1,A2)=\frac{1}{2}*[p(A2|A1)+p(A1|A2)],$$

where A1 and A2 are the accounts in the account pair, $p(A2|A1)$ is the probability of reaching node A2 in the unidirected bi-partite graph if one started at node A1 and were allowed to traverse a path of size two, and $p(A1|A2)$ is the probability of reaching node A1 in the unidirected bi-partite graph if one started at node A2 and were allowed to traverse a path of size two.

The score for a pair of accounts may represent the probability of the accounts being owned by the same customer. Backend matching unit 450 may score account pairs based on a single account attribute at a time. For example, backend matching unit 450 may score an account pair based on the IP addresses that they share, and then may score the account pair based on the contact names that they share, etc. Backend matching unit 450 may combine the scores from different account attributes to generate a single score for an account pair.

Prioritization Reviewing Unit

Figure 10:
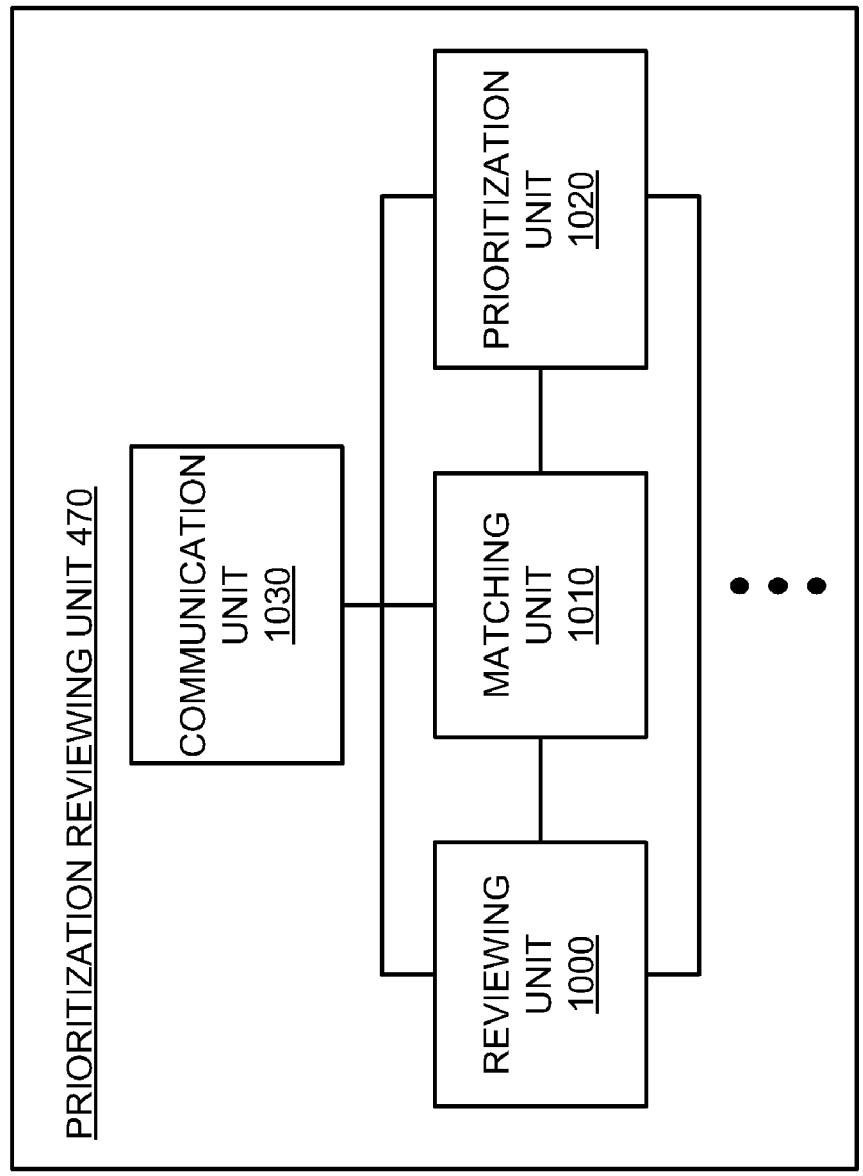
FIG. 10 is an exemplary diagram of a prioritization reviewing unit of the exemplary system of FIG. 4.

Prioritization reviewing unit 470, as shown in FIG. 10, may perform a variety of tasks to aid in identification of duplicate accounts. For example, in one implementation, prioritization reviewing unit 470 may include a reviewing unit 1000 that periodically (e.g., daily, weekly, etc.) reviews terminated accounts provided in account database 410. Prioritization reviewing unit 470 may include a matching unit 1010 that retrieves open accounts from duplicate database 420 and matches open accounts to the terminated accounts for matches that may be greater than a preset score threshold. Prioritization reviewing unit 470 may include a prioritization unit 1020 that prioritizes the matched accounts greater than the preset score threshold based on the scores of the matched accounts. Prioritization reviewing unit 470 may also include a communication unit 1030 that communicates or provides the prioritized matched accounts to review queue database 430. The prioritized matched accounts may be filtered by prioritization reviewing unit 470 to exclude recently reviewed account pairs or account pairs already stored in review queue database 430.

Although FIG. 10 shows exemplary tasks performed by prioritization reviewing unit 470, in other implementations, prioritization reviewing unit 470 may perform additional tasks that may be used to identify duplicate accounts.

Frontend Reviewing Unit

Figure 11A:
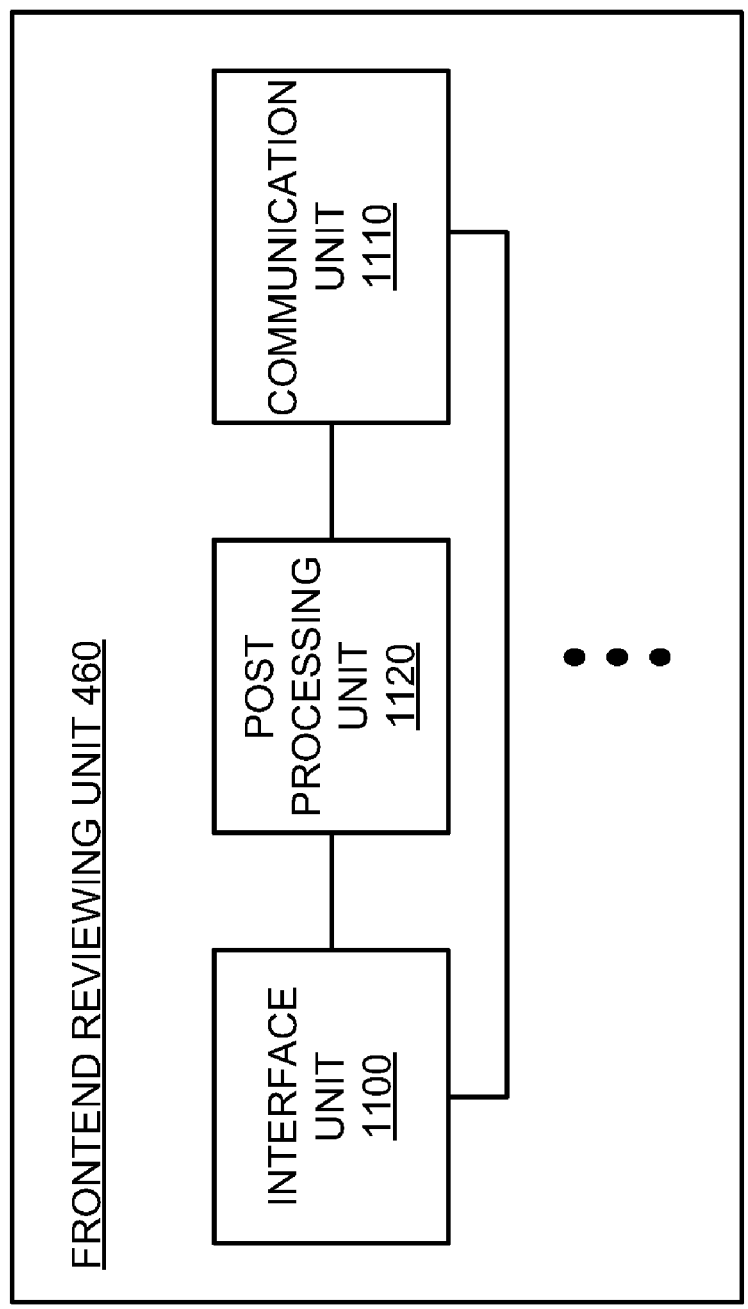
FIG. 11A is an exemplary diagram of a frontend reviewing unit of the exemplary system of FIG. 4.

Frontend reviewing unit 460, as shown in FIG. 11A, may perform a variety of tasks to aid in identification of duplicate accounts. For example, in one implementation, frontend reviewing unit 460 may include an interface unit 1100 that provides an interface (FIG. 11B) for confirmation of account matches for post processing, a communication unit 1110 that communicates or provides confirmed account matches to completed reviews database 440, and a post processing unit 1130 that performs post processing on confirmed account matches.

The interface of frontend reviewing unit 460 may operate in two modes: a "review queue mode" which may display matches for the highest priority accounts in review queue database 430, and a "one off mode" which may display matches for user-supplied accounts. In both modes, front reviewing unit 460 may query duplicate database 420 for scores and attributes on which other accounts (e.g., accounts A2, A3, . . . , An) match an account (e.g., account A1) being investigated. Frontend reviewing unit 460 may query account database 410 for displayable information (e.g., account attributes such as contact name, creation time, email address, physical address, telephone number, account history, etc.) regarding each account. The displayable information may be manually inspected to confirm system-detected account matches.

Frontend reviewing unit 460 may display a table, as shown in FIG. 11B, that may include rows corresponding to each account and columns corresponding to various fields (e.g., account attributes). The table may include a particular account (e.g., account A1) and any matched accounts (e.g., accounts A2, A3, ..., An). The matched accounts may be ordered (e.g., in descending order) based on the scores of the matches with the particular account. The account attributes may be aligned for the accounts to allow for easy manual assessment of similarities for account attributes. For example, a column 1140 may include rows corresponding to accounts (e.g., accounts A1, A2, A3, ..., An). Another column 1150 may correspond to a first account attribute (e.g., field 1, which may be a physical address), and may include rows providing physical addresses for each account (e.g., addresses for A1, A2, A3, ..., An). Still another column 1160 may correspond to a second account attribute (e.g., field 2, which may be an email address), and may include rows providing email addresses for each account (e.g., addresses for A1, A2, A3, ..., An). A still further column 1170 may correspond to a third account attribute (e.g., field 3, which may relate to a geographical map 1175 that may be displayed with the table), and may include rows providing markers (e.g., links, buttons, icons, etc.) that may correspond to markers provided on geographical map 1175 for each account (e.g., addresses for A1, A2, A3, ..., An) based on the physical locations of each account as indicated by the postal address.

Geographical map 1175 may include markers (e.g., links, buttons, icons, etc.) that correspond to the geographic locations of the accounts. As shown in FIG. 11B, selection of a marker in geographical map 1175 may reveal account information related to the selected marker, which may enable identification of an account location in geographical map 1175. Selection of a marker in the table may cause the corresponding marker in geographical map 1175 to display account information, which may enable identification of account location in geographical map 1175.

As further shown in FIG. 11B, the table may include a column 1130 that may indicate matches with a particular account (e.g., account A1). A variety of mechanisms may be used in column 1130 to indicate matches with account A1. In one implementation, a letter code may be provided for each account attribute, and if an account attribute matches with account A1, the letter code may be provided in column 1130. For example, if the physical address attribute is designated by an "A" and the email address attribute is designated by an "E" (as shown at 1180), and account A2 matches with account A1 on both of these attributes, then the table may include an entry "AE" next to account A2. This may indicate that these two attributes of account A2 match with corresponding attributes of account A1. As further shown in FIG. 11B, the email address attribute (e.g., "E") of account A3 matches with the corresponding attribute of account A1, and no attributes of account An matches with any attributes of account A1 (e.g., as indicated by the "NONE").

In one implementation, a person may manually review the table of FIG. 11B and may identify two accounts (e.g., rows) that are determined to be the same customer by selecting the two rows and by selecting a submission mechanism 1190 (e.g., a button, an icon, a link, etc.). Upon selection of submission mechanism 1190, the two accounts may be recorded in completed reviews database 440. In another implementation, a preset threshold may be provided for the number of matches, and frontend reviewing unit 460 may automatically record accounts having matches equal to or above the preset threshold in completed reviews database 440.

Frontend reviewing unit 460 may query completed reviews database 440 for two accounts determined to be the same customer. In one implementation, frontend reviewing unit 460 may automatically terminate one of the accounts. For example, if one of the accounts was terminated due to policy violations (e.g., use of spam, etc.), then the open account may be terminated. In another example, if both accounts are still open and not policy violations have occurred (other than having two accounts), frontend reviewing unit 460 may terminate the account created later or earlier in time, may inform the customer that they have duplicate accounts and ask them to choose an account for termination, may seek more information from the customer as to why they have two accounts, etc. In another implementation, frontend reviewing unit 460 may automatically terminate both accounts. For example, if a company informs customers that creation of duplicate accounts will result in immediate termination of both accounts, then frontend reviewing unit 460 may immediately terminate both accounts.

Although FIG. 11A shows exemplary tasks performed by frontend reviewing unit 460, in other implementations, frontend reviewing unit 460 may perform additional tasks that may be used to identify duplicate accounts. Although FIG. 11B shows an exemplary table provided by frontend reviewing unit 460, in other implementation, frontend reviewing unit 460 may provided more, less, or different, columns and rows in the table.

Exemplary Processes

FIGS. 12A-12D are flowcharts of an exemplary process for matching and scoring duplicate accounts. FIG. 13 is a flowchart of an exemplary process for creating entries in the review queue database. FIG. 14 is a flowchart of an exemplary process for reviewing and terminating matched accounts.

Exemplary Matching and Scoring Process

Figure 12A:
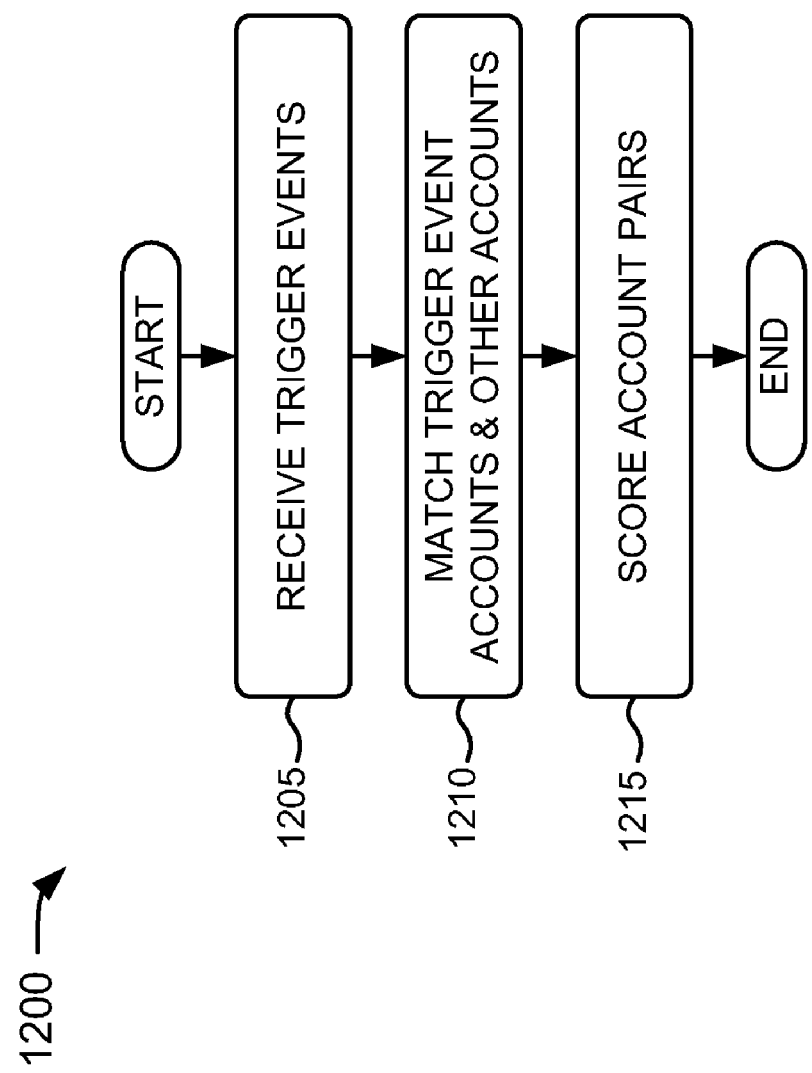
FIGS. 12A-12D are flowcharts of an exemplary process for matching and scoring duplicate accounts.
Figure 13:
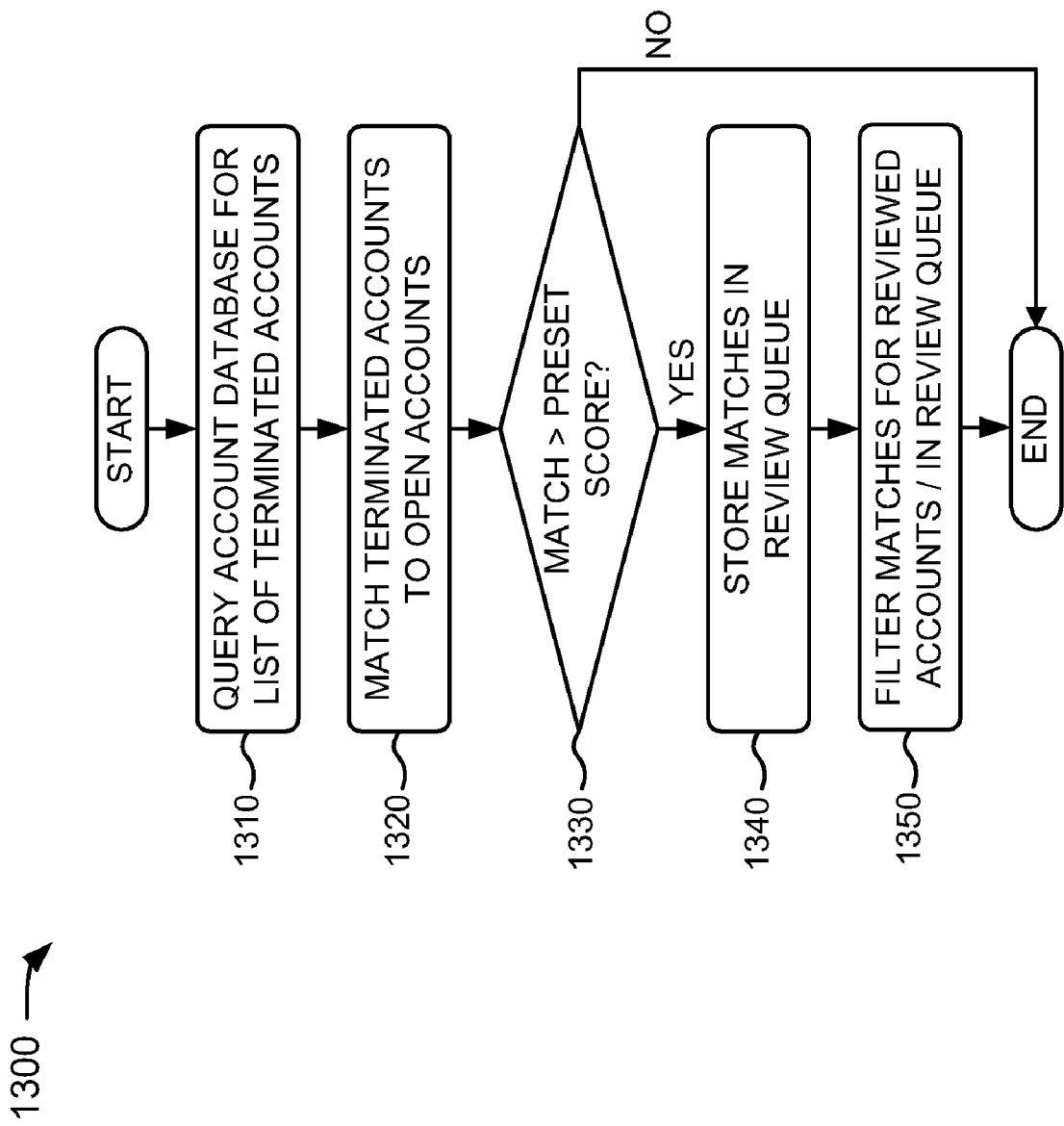
FIG. 13 is a flowchart of an exemplary process for creating entries in the review queue database.

As shown in FIG. 12A, a process 1200 for matching and scoring duplicate accounts may begin with receipt of trigger events (block 1205). For example, in one implementation described above in connection with FIG. 9, backend matching unit 450 may periodically (e.g., daily, weekly, etc.) search for trigger events and may perform duplicate checks on the triggered accounts. An account may be triggered for a variety of reasons (e.g., a customer logging into an account, an account being recently created, etc.).

Process 1200 may match trigger event accounts with other accounts (block 1210). For example, in one implementation described above in connection with FIG. 9, matching unit 900 of backend matching unit 450 may match triggered accounts to open accounts provided in account database 410.

As further shown in FIG. 12A, process 1200 may score matched account pairs (block 1215). For example, in one implementation described above in connection with FIG. 9, backend matching unit 450 may score account pairs based on exact matching of account attributes (e.g., IP addresses). Backend matching unit 450 may combine the scores from different account attributes to generate a single score for an account pair.

Figure 12B:
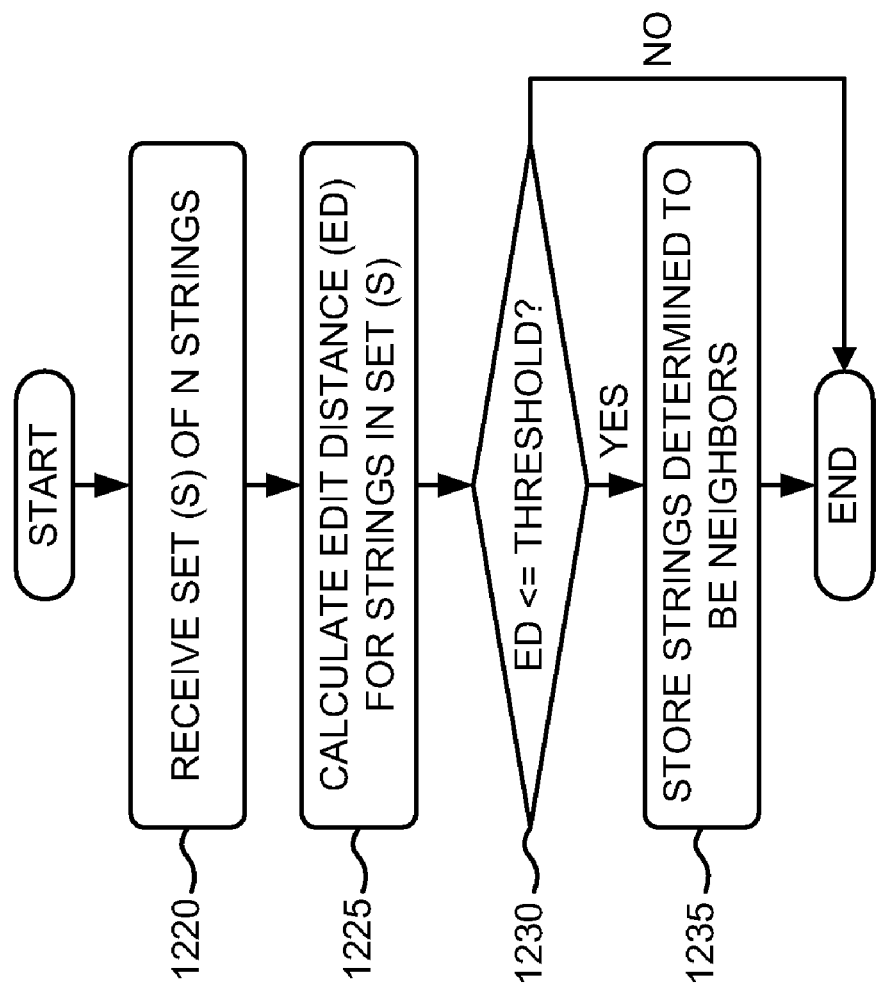

Process block 1210 (FIG. 12A) of process 1200 may include the blocks shown in FIG. 12B. Thus, process block 1210 may receive a set (S) of N strings (block 1220). For example, in one implementation described above in connection with FIG. 9, assuming that a database (e.g., account database 410) includes set (S) of N strings, backend matching unit 450 may receive set (S) of N strings. Process block 1210 may calculate the edit distance (ED) for each string in set (S)

(block 1225). For example, in one implementation described above in connection with FIG. 9, backend matching unit 450 may use a string edit distance for the strings in set (S) as a measure of similarity for account matching purposes.

As further shown in FIG. 12B, if the string edit distance is less than or equal to a preset edit distance threshold (block 1230—YES), then process block 1210 may store strings determined to be neighbors (block 1235). For example in one implementation described above in connection with FIG. 9, backend matching unit 450 may determine whether each string of set (S) is a neighbor of the other strings, where two strings may be considered neighbors if their edit distance is less than or equal to a preset edit distance threshold. Backend matching unit 450 may provide the relationships of matched accounts to duplicate database 420. If the string edit distance is greater than the preset edit distance threshold (block 1230—NO), then process block 1210 may end.

Figure 12C:
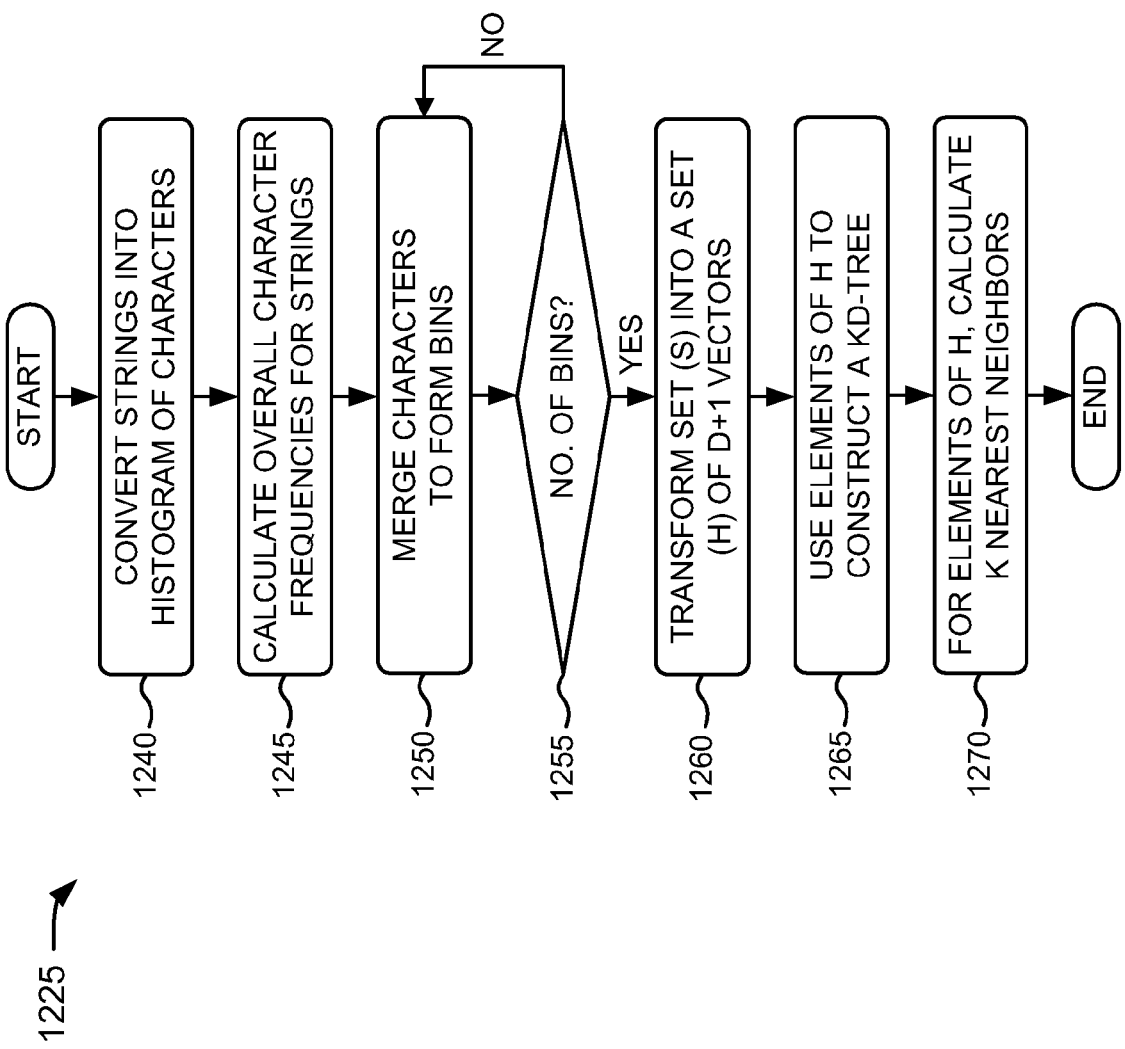

Process block 1225 (FIG. 12B) of process 1200 may include the blocks shown in FIG. 12C. Thus, process block 1225 may convert the strings of set (S) into a histogram of frequencies (block 1240). For example, in one implementation described above in connection with FIG. 9, backend matching unit 450 may convert each string of set (S) into a histogram of characters. For example, backend matching unit 450 may convert the characters of "foo dr" into {"f,":1, "o":2, "d":1, "r":1}.

Process block 1225 may calculate the overall character frequencies for the strings (block 1245). For example, in one implementation described above in connection with FIG. 9, backend matching unit 450 may calculate the overall character frequencies for the stings simultaneously with or after creation of the histogram of characters.

Process block 1225 may merge the characters to form bins (block 1250). For example, in one implementation described above in connection with FIG. 9, backend matching unit 450 may merge the characters to form bins. A variety of merging techniques may be used to merge characters to form bins, e.g., Huffman coding. In one example, backend matching unit 450 may assign each character to its own bin. The count of a bin may represent the frequency of the set of characters included in the bin.

The characters may be merged until a preset number of bins (D) is obtained (block 1255). For example, in one implementation described above in connection with FIG. 9, backend matching unit 450 may merge the bins with the lowest counts into a single bin, and may merge the counts until a preset number (D) of bins is obtained. If the preset number of bins (D) is reached (block 1255—YES), then process block 1225 may transform set (S) into a set (H) of D+1 vectors (block 1260). For example, in one implementation described above in connection with FIG. 9, backend matching unit 450 may convert the histogram of characters for each string into a corresponding smaller dimension histogram of bins using the character to bin mapping obtained from the merging technique (e.g., Huffman coding). Backend matching unit 450 may further append the length of each string as the last bin of the corresponding histogram of bins. At this point, backend matching unit 450 may have transformed set (S) into another set (H) of D+1 dimensional integral vectors.

As further shown in FIG. 12C, process block 1225 may use elements of set (H) to construct a kd-tree (block 1265). For example, in one implementation described above in connection with FIG. 9, backend matching unit 450 may use the elements of set (H) to construct a kd-tree, and may use Manhattan distance (also known as $L_1$ distance) as the distance metric. For the elements of set (H), process block 1225 may calculate the "k" nearest neighbors (block 1270). For example, in one implementation described above in connection with FIG. 9, for each element of set (H), backend matching unit 450 may locate its "k" nearest neighbors using a fixed radius search, where the radius may equal two times the preset edit distance threshold. Backend matching unit 450 may calculate the exact edit distance between the located "k" nearest neighbors and may keep the neighbors that have an edit distance of less than or equal to the preset edit distance threshold.

Figure 12D:
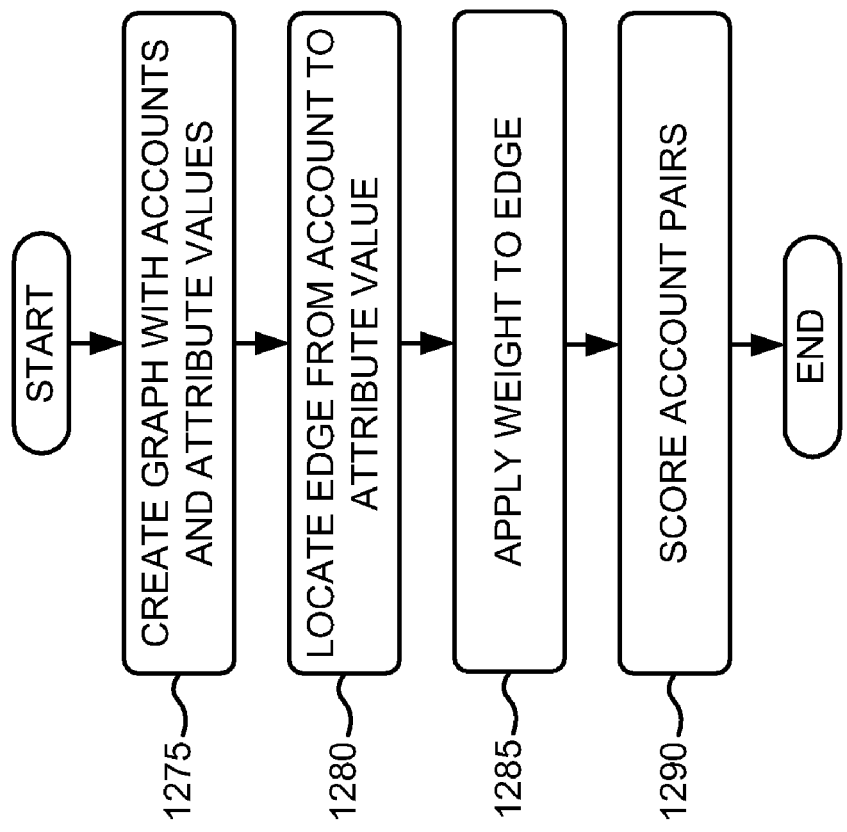

Process block 1215 (FIG. 12A) of process 1200 may include the blocks shown in FIG. 12D. Thus, process block 1215 may create a graph with accounts and attribute values (block 1275). For example, in one implementation described above in connection with FIG. 9, backend matching unit 450 may create a unidirected bi-partite graph that may include the accounts on one side, and values for account attributes on another side. Process block 1215 may locate the edge from an account to an attribute value (block 1280). For example, in one implementation described above in connection with FIG. 9, an edge may be created from an account to account attribute in the graph, e.g., an edge may be created from an account to an IP address (i.e., an account attribute) if the customer has logged into their account using the IP address.

As further shown in FIG. 12D, process block 1215 may apply weight to the edge (block 1285). For example, in one implementation described above in connection with FIG. 9, the weight on the edge may be the number of times the customer has logged into the account using the IP address.

Process block 1215 may score the account pairs (block 1290). For example, in one implementation described above in connection with FIG. 9, backend matching unit 450 may score an account pair according to the following equation:

$$Score(A1,A2) = \tfrac{1}{2} * [p(A2|A1) + p(A1|A2)],$$

where A1 and A2 are the accounts in the account pair, p(A2|A1) is the probability of reaching node A2 in the unidirected bi-partite graph if one started at node A1 and were allowed to traverse a path of size two, and p(A1|A2) is the probability of reaching node A1 in the unidirected bi-partite graph if one started at node A2 and were allowed to traverse a path of size two. The score for a pair of accounts may represent the probability of the accounts being owned by the same customer. Backend matching unit 450 may score account pairs based on a single account attribute at a time. Backend matching unit 450 may combine the scores from different account attributes to generate a single score for an account pair.

Exemplary Process for Creating Entries in Review Queue Database

As shown in FIG. 13, a process 1300 for creating entries in review queue database 430 may query the account database for a list of terminated accounts (block 1310). For example, in one implementation described above in connection with FIG. 10, prioritization reviewing unit 470 may periodically (e.g., daily, weekly, etc.) perform a task 1000 of reviewing terminated accounts provided in account database 410. Process 1300 may match terminated accounts to open accounts (block 1320). For example, in one implementation described above in connection with FIG. 10, for each terminated account, prioritization reviewing unit 470 may retrieve open accounts from duplicate database 420 and match open accounts to the terminated accounts.

As further shown in FIG. 13, process 1300 may determine if a match is greater than a preset score threshold (block 1330). For example, in one implementation described above in connection with FIG. 10, prioritization reviewing unit 470 may determine if the matched accounts have a score greater than the preset score threshold, and may prioritize the matched accounts based on their scores. If a match is greater than preset score threshold (block 1330—YES), then process 1300 may store matches in the review queue database (block 1340). For example, in one implementation described above in connection with FIG. 10, prioritization reviewing unit 470 may provide the prioritized matched accounts to review queue database 430. Process 1300 may filter matches to exclude already reviewed account pairs and account pairs in the review queue database (block 1350). For example, in one implementation described above in connection with FIG. 10, the prioritized matched accounts may be filtered by prioritization reviewing unit 470 to exclude recently reviewed account pairs or account pairs already stored in review queue database 430.

Exemplary Process for Reviewing and Terminating Matched Accounts

As shown in FIG. 14, a process 1400 reviewing and terminating matched accounts may query the duplicate database for scores and attributes (block 1410). For example, in one implementation described above in connection with FIGS. 11A and 11B, front reviewing unit 460 may query duplicate database 420 for scores and attributes on which other accounts (e.g., accounts A2, A3, . . . , An) match an account (e.g., account A1) being investigated. Process 1400 may query the account database for each account (block 1420). For example, in one implementation described above in connection with FIGS. 11A and 11B, frontend reviewing unit 460 may query account database 410 for displayable information (e.g., account attributes such as contact name, creation time, email address, physical address, telephone number, account history, etc.) regarding each account.

As further shown in FIG. 14, process 1400 may display a table with attributes for similarity assessment (block 1430). For example, in one implementation described above in connection with FIGS. 11A and 11B, frontend reviewing unit 460 may display a table that may include rows corresponding to each account and columns corresponding to various fields (e.g., account attributes). The table may include a particular account (e.g., account A1) and any matched accounts (e.g., accounts A2, A3, . . . , An). The matched accounts may be ordered (e.g., in descending order) based on the scores of the matches with the particular account. The account attributes may be aligned for the accounts to allow for easy manual assessment of similarities for account attributes. A column 1140 may include rows corresponding to accounts (e.g., accounts A1, A2, A3, . . . , An). Another column 1150 may correspond to a first account attribute (e.g., field 1, which may be a physical address), and may include rows providing physical addresses for each account (e.g., addresses for A1, A2, A3, . . . , An). Still another column 1160 may correspond to a second account attribute (e.g., field 2, which may be an email address), and may include rows providing email addresses for each account (e.g., addresses for A1, A2, A3, . . . , An). The table may include column 1130 that may indicate matches with a particular account (e.g., account A1). A variety of mechanisms may be used in column 1130 to indicate matches with account A1. In one implementation, a letter code may be provided for each account attribute, and if an account attribute matches with account A1, the letter code may be provided in column 1130.

Process 1400 may display a map showing account locations based on the physical addresses of the accounts (block 1440). For example, in one implementation described above in connection with FIGS. 11A and 11B, column 1170 may correspond to a third account attribute (e.g., field 3, which may relate to geographical map 1175 that may be displayed with the table), and may include rows providing markers (e.g., links, buttons, icons, etc.) that may correspond to markers provided on geographical map 1175 for each account (e.g., addresses for A1, A2, A3, . . . , An) based on the physical locations of each account as indicated by the postal address. Geographical map 1175 may include markers (e.g., links, buttons, icons, etc.) that correspond to the geographic locations of the accounts. As shown in FIG. 11B, selection of a marker in geographical map 1175 may reveal account information related to the selected marker, which may enable identification of an account location in geographical map 1175. Selection of a marker in the table may cause the corresponding marker in geographical map 1175 to display account information, which may enable identification of account location in geographical map 1175.

As further shown in FIG. 14, process 1400 may store the reviewed accounts in the completed reviews database (block 1450). For example, in one implementation described above in connection with FIGS. 11A and 11B, a person may manually review the table of FIG. 11B and may identify two accounts (e.g., rows) that are determined to be the same customer by selecting the two rows and by selecting submission mechanism 1190 (e.g., a button, an icon, a link, etc.). Upon selection of submission mechanism 1190, the two accounts may be recorded in completed reviews database 440. In another implementation, a preset threshold may be provided for the number of matches, and frontend reviewing unit 460 may automatically record accounts having matches equal to or above the preset threshold in completed reviews database 440.

Process 1400 may terminate matched open accounts (block 1460). For example, in one implementation described above in connection with FIGS. 11A and 11B, frontend reviewing unit 460 may query completed reviews database 440 for two accounts determined to be the same customer. In one implementation, frontend reviewing unit 460 may automatically terminate one of the accounts. In another implementation, frontend reviewing unit 460 may automatically terminate both accounts.

CONCLUSION

Implementations described herein may provide systems and methods for identifying, scoring, and terminating duplicate and/or related accounts. For example, in one implementation, the system may match or identify accounts based on any user-supplied information (e.g., a contact name) or system-detected identifying information (e.g., an Internet Protocol (IP) address). The system may also score the matching accounts, and may generate a queue of interesting matches. The scored matching accounts may be confirmed, and any open duplicate accounts may be terminated.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 12A-14, the order of the acts may be modified in other implementations consistent with principles of the invention. Further, non-dependent acts may be performed in parallel.

In one implementation, server 220 may perform most, if not all, of the acts described with regard to the processing of FIGS. 12A-14. In another implementation, one or more, or all, of the acts may be performed by another entity, such as another server 230 and/or 240 or client 210.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer system, the method comprising:
   receiving, using a communication interface associated with the computer system, a trigger event for a first user account;
   receiving, using a communication interface associated with the computer system, a string related to the first account;
   converting, using one or more processors associated with the computer system, the string into a histogram of characters of the string;
   converting, using one or more processors associated with the computer system, the histogram of characters into a histogram of bins using a character to bin mapping;
   appending, using one or more processors associated with the computer system, a length of the string as a last bin of the histogram of bins;
   calculating, using one or more processors associated with the computer system, a particular number of nearest neighbors for the histogram of bins in a kd-tree;
   calculating, using one or more processors associated with the computer system, a string edit distance between the histogram of bins and a particular neighbor of the calculated nearest neighbors;
   if the string edit distance is greater than a preset threshold for the particular neighbor, designating a match between the first user account and a second user account that is associated with the particular neighbor, to create a matched user account pair, where the designating is performed using one or more processors associated with the computer system; and
   scoring, using one or more processors associated with the computer system, the matched user account pair.

2. The method of claim 1, further comprising:
   searching for the trigger event.

3. The method of claim 1, further comprising:
   storing the matched user account pair.

4. The method of claim 1, where the scoring comprises:
   creating a graph that includes the first and second user accounts on one side, and values for account attributes on another side;
   locating an edge from one of the first and second user accounts to one account attribute value; and
   applying a weight to the edge.

5. The method of claim 1, where the scoring comprises:
   scoring the matched user account pair according to the following equation:

$$\text{Score}(A1,A2) = \frac{1}{2} * [p(A2|A1) + p(A1|A2)],$$

where A1 is the first user account, A2 is the second user account, $p(A2|A1)$ is the probability of reaching node A2 in a unidirected bi-partite graph if one started at node A1 and were allowed to traverse a path of size two, and $p(A1|A2)$ is the probability of reaching node A1 in the unidirected bi-partite graph if one started at node A2 and were allowed to traverse a path of size two.

6. The method of claim 1, where the score for the matched user account pair represents a probability of the first and second user accounts being owned by the same user.

7. The method of claim 1, where the scoring comprises:
   scoring the matched user account pair based on a single account attribute at a time; and
   combining the scores from different account attributes to generate a single score for the matched user account pair.

8. A computer system comprising:
   one or more server devices comprising:
      a backend matching unit that:
         receives a string related to a first account,
         converts the string into a histogram of characters of the string,
         converts the histogram of characters into a histogram of bins using a character to bin mapping,
         appends a length of the string as a last bin to the histogram of bins,
         calculates a string edit distance between the histogram of bins and a neighbor in a kd-tree,
         if the string edit distance is greater than a threshold, designates a matched account pair of the first account and a second account associated with the neighbor, and
         assigns scores to the matched account pair; and
      a prioritization reviewing unit that receives matched account pairs and the scores of the pairs, and prioritizes the matched account pairs based on the scores.

9. The system of claim 8, further comprising:
   a frontend reviewing unit that reviews the matched account pairs, and determines if the matched account pairs are potential duplicate accounts.

10. The system of claim 8, where the backend matching unit searches for trigger events and performs account matching and scoring on accounts corresponding to the triggered events.

11. The system of claim 8, where the backend matching unit:
   creates a graph that includes accounts on one side, and values for account attributes on another side,
   locates an edge from the accounts to the account attribute values, and
   applies a weight to the edge.

12. The system of claim 8, where the backend matching unit:
   scores a matched account pair according to the following equation:

$$\text{Score}(A1,A2) = \frac{1}{2} * [p(A2|A1) + p(A1|A2)],$$

where A1 is a first account, A2 is the a second account, $p(A2|A1)$ is the probability of reaching node A2 in a unidirected bi-partite graph if one started at node A1 and were allowed to traverse a path of size two, and $p(A1|A2)$ is the probability of reaching node A1 in the unidirected bi-partite graph if one started at node A2 and were allowed to traverse a path of size two.

13. The system of claim 12, where the score for the matched account pair represents a probability of the first and second accounts being associated with the same user.

14. The system of claim 8, where the backend matching unit:
scores each matched account pair based on a single account attribute at a time; and
combines the scores from different account attributes to generate a single score for the matched account pair.

15. The system of claim 8, where the prioritization reviewing unit reviews terminated accounts.

16. The system of claim 15, where the prioritization reviewing unit matches open accounts to the terminated accounts for matches that may be greater than a preset score threshold.

17. The system of claim 16, where the prioritization reviewing unit prioritizes the matched accounts greater than the preset score threshold based on the scores of the matched accounts.

18. The system of claim 17, where the prioritization reviewing unit filters recently reviewed matched accounts or matched accounts already in storage.

19. The system of claim 9, where the frontend reviewing unit provides an interface for confirmation of matched accounts.

20. The system of claim 19, where the frontend reviewing unit receives account scores and attributes, and displayable information.

21. The system of claim 20, where the interface of the frontend reviewing unit provides a table that includes rows corresponding to each account and columns corresponding to account attributes.

22. The system of claim 21, where the table further includes a column that indicates matches between two accounts based on one or more account attributes.

23. The system of claim 22, where the frontend reviewing unit enables identification of two accounts that are determined to be the same user by selecting the two rows corresponding to the identified accounts.

24. The system of claim 22, where the frontend reviewing automatically identifies accounts having matches equal to or above a preset threshold.

25. The system of claim 9, where the frontend reviewing unit terminates one of two accounts determined to be duplicates based on matches equal to or exceeding a preset threshold.

26. The system of claim 9, where the frontend reviewing unit terminates two accounts determined to be duplicates.

27. A system comprising:
one or more devices comprising:
a memory to store accounts;
means for receiving trigger events for the accounts;
means for mapping characters to bins;
means for converting a string associated with one of the accounts into a histogram of bins based on the mapping;
means for appending a length of the string to the histogram of bins as an additional bin of the histogram of bins;
means for determining a string edit distance between the histogram of bins and a neighbor in a kd-tree;
means for matching the one of the accounts to another one of the accounts based on the string edit distance being greater than a threshold where the other one of the accounts is associated with the neighbor in the kd-tree;
means for scoring the matched accounts; and
means for utilizing the matched and scored account pair to determine a duplicate account.

28. A system comprising:
a memory to store a plurality of instructions; and
a processor to execute instructions in the memory to:
match accounts based on attributes of the accounts,
retrieve strings associated with the attributes,
convert strings into histograms of characters,
convert the histograms of characters into histograms of bins based on a character-to-bin mapping,
append a histogram of bins with an extra bin representing a length of the string associated with the histogram,
calculate a string edit distance between the histogram of bins and a neighbor in a kd-tree, where the string is associated with an attribute of a first account and where the neighbor is associated with a corresponding attribute of a second account,
score the first account and the second account based on the string edit distance,
utilize the scored account pair to determine whether the first account pair and the second account pair comprise duplicate accounts, and
terminate at least one of the first account or the second account.

29. The method of claim 1, further comprising:
utilizing the scored matched account pairs to determine duplicate accounts; and
terminating at least one of the accounts in a duplicate account pair.

30. The method of claim 1, where the trigger event comprises at least one of a user logging into the first user account or the first user account being recently created.

31. The system of claim 27, where the attributes include user name, user address, login information, personal information, payment information, industry information, or account information.

32. The system of claim 27, where the scores represent probabilities of accounts being owned by the same user.

33. The system of claim 27, where the trigger events comprise at least one of a user logging into an account or an account being created.

34. The system of claim 27, further comprising:
means for terminating a determined duplicate account.

35. The system of claim 28, where the character-to-bin mapping is based on Huffman coding.

36. The system of claim 28, where the processor further executes instructions in the memory to:
indicate, for the scored account pair, which particular attributes of the first account and the second account match.

37. One or more memory devices storing instructions executable by one or more processors, the one or more memory devices comprising:
one or more instructions to receive a trigger event for a first user account;
one or more instructions to receive a string related to the first account;
one or more instructions to convert the string into a histogram of characters of the string;
one or more instructions to convert the histogram of characters into a histogram of bins using a character to bin mapping;

one or more instructions to append a length of the string as a last bin of the histogram of bins;

one or more instructions to calculate a particular number of nearest neighbors for the histogram of bins in a kd-tree;

one or more instructions to calculate a string edit distance between the histogram of bins and a particular neighbor of the calculated nearest neighbors;

one or more instructions to, if the string edit distance is greater than a preset threshold for the particular neighbor, designate a match between the first user account and a second user account that is associated with the particular neighbor, to create a matched user account pair; and one or more instructions to score the matched user account pair.

38. The one or more memory devices of claim 37, where the one or more instructions to score the matched user account pair comprise:

one or more instructions to create a graph that includes the first and second user accounts on one side, and values for account attributes on another side;

one or more instructions to locate an edge from one of the first and second user accounts to one account attribute value; and one or more instructions to apply a weight to the edge.

39. The one or more memory devices of claim 37, where the one or more instructions to score the matched user account pair comprise:

one or more instructions to score the matched user account pair based on a single account attribute at a time; and one or more instructions to combine the scores from different account attributes to generate a single score for the matched user account pair.

* * * * *